(12) United States Patent
Crook et al.

(10) Patent No.: US 11,002,008 B2
(45) Date of Patent: May 11, 2021

(54) FIRE RESISTANT GLAZING UNIT

(71) Applicant: Pyroguard UK Ltd.

(72) Inventors: Vincent Crook, St. Helens (GB); John Holland, St. Helens (GB)

(73) Assignee: PYROGUARD UK LTD., St. Helens (GB)

( * ) Notice: Subject to any disclaimer, the term of this patent is extended or adjusted under 35 U.S.C. 154(b) by 0 days.

(21) Appl. No.: 16/271,956

(22) Filed: Feb. 11, 2019

(65) Prior Publication Data

US 2020/0040570 A1 Feb. 6, 2020
US 2020/0308828 A9 Oct. 1, 2020

(30) Foreign Application Priority Data

Feb. 14, 2018 (GB) ..................................... 1802411

(51) Int. Cl.
*E04B 1/94* (2006.01)
*B32B 3/08* (2006.01)
(Continued)

(52) U.S. Cl.
CPC ................ *E04B 1/942* (2013.01); *B32B 3/08* (2013.01); *B32B 17/069* (2013.01); *B32B 17/10036* (2013.01); *B32B 17/10311* (2013.01); *B32B 17/10697* (2013.01); *E06B 3/66304* (2013.01); *E06B 3/66333* (2013.01); *E06B 3/67326* (2013.01); *B32B 2419/00* (2013.01)

(58) Field of Classification Search
CPC ......... E04B 1/942; B32B 3/08; B32B 17/069; B32B 17/10311; B32B 17/10697; B32B 17/10; B32B 17/10302; B32B 2419/00; B32B 2307/3065; E06B 3/66304; E06B 3/66333; E06B 3/67326; E06B 3/66309; E06B 3/66328; E06B 5/165; E06B 5/16
See application file for complete search history.

(56) References Cited

U.S. PATENT DOCUMENTS 3,988,276 A * 10/1976 Kutch ..................... C08L 75/04
523/433
4,264,681 A 4/1981 Girard et al.
(Continued)

FOREIGN PATENT DOCUMENTS

DE 102005018842 A1 * 10/2006 ........... B32B 17/069
DE 102005018842 A1 10/2006
(Continued)

OTHER PUBLICATIONS

IGK, IGK 331 Data Sheet (Year: 2016).*
Google Patent Translation of DE-102005018842-A1 (Year: 2020).*

*Primary Examiner* — Michael Zhang
(74) *Attorney, Agent, or Firm* — Jordan IP Law, LLC; Todd A. Vaughn

(57) ABSTRACT

Fire resistant glazing units, processes for the manufacture of such fire resistant glazing units, the use of fire resistant glazing units in construction, and constructions comprising such glazing units. A fire resistant glazing unit may include two panes of glass which are arranged together with a seal to enclose a fire-resistant interlayer. The seal is adapted to breach in the event of a fire causing increased pressure between the panes, releasing pressure before it can build up and cause a pane to break in an unfavourable manner.

2 Claims, 6 Drawing Sheets

(51) Int. Cl.
*B32B 17/06* (2006.01)
*B32B 17/10* (2006.01)
*E06B 3/663* (2006.01)
*E06B 3/673* (2006.01)

(56) References Cited

U.S. PATENT DOCUMENTS

| | | | |
|---|---|---|---|
| 5,547,720 A * | 8/1996 | Rittler | E06B 5/165 |
| | | | 428/34 |
| 2005/0000623 A1 | 1/2005 | Lindberg et al. | |
| 2009/0148708 A1 * | 6/2009 | Goelff | C09K 21/02 |
| | | | 428/426 |
| 2011/0256390 A1 * | 10/2011 | Klossek | B32B 17/10761 |
| | | | 428/337 |
| 2012/0076966 A1 * | 3/2012 | Holland | B32B 17/069 |
| | | | 428/38 |
| 2013/0196091 A1 | 8/2013 | Wildenhain et al. | |

FOREIGN PATENT DOCUMENTS

| | | |
|---|---|---|
| EP | 1205524 A2 | 5/2002 |
| GB | 1562792 A | 3/1980 |
| WO | 2003061963 A1 | 7/2003 |
| WO | 2008053247 A1 | 5/2008 |
| WO | 2008084083 A1 | 7/2008 |
| WO | 2009071409 A1 | 6/2009 |
| WO | 2011027163 A1 | 3/2011 |

* cited by examiner

FIRE RESISTANT GLAZING UNIT

CROSS-REFERENCE TO RELATED APPLICATIONS

The present application claims priority under 35 U.S.C. § 119 to Great Britain Patent Publication No. GB 1802411.7 (filed on Feb. 14, 2018), which is hereby incorporated by reference in its complete entirety.

TECHNICAL FIELD

The present specification relates to fire resistant glazing units and processes for their manufacture. It also relates to the use of fire resistant glazing units in construction, and constructions comprising such glazings.

BACKGROUND

Glazing, such as "insulated glazing units" (IGUs) and the like, is widely used in both domestic environments (e.g. in double-glazed windows for homes) and in industrial settings. Most types of glazing rely on glass panes for support and to provided transparency, but the vulnerability of glass to thermal shock means that such glazing is typically not well suited to environments where there is an inherent fire risk. To minimise fire safety issues, many countries impose safety regulations that specify a certain fire resistance that needs to be exhibited by glazing used in a particular location.

In much of Europe, regulations classify the fire resistance of glazing by the measurement of the minimum time for which the glazing maintains: (i) its structural integrity (termed E); (ii) its structural integrity and radiation reduction within specified limits (termed EW); and (iii) its structural integrity and insulation within specified limits (termed EI) when exposed to a fire. Standard tests to determine the classification of the fire resistance of glazing are known and typically involve exposing the one side of the glazing unit (the "fire side" or "hot side") to a fire and monitoring the integrity of the glazing, and/or temperature levels on the opposing side of the glazing (the "cold side") over time.

Fire resistant glazing in which the internal space between the glass panes is filled with an interlayer of aqueous fire-resistant gel (i.e. a hydrogel) are described in U.S. Pat. No. 4,264,681 B [SAINT GOBAIN], WO 2003/061963 [FLAMRO], and WO 2009/071409 [FLAMRO]. Fire resistant glazing comprising silicate based fire resistant interlayers are also known (for example WO 2008/084083 [PILKINGTON], WO 2008/053247 [PILKINGTON] and WO 2011/027163 [PILKINGTON]). These types of fire resistant glazing are commonly referred to either as glazing units or glazing laminates.

A known issue of many types of fire resistant glazing is that in some circumstances, associated with the type of fire and wider glazing system, when the glazing is exposed to fire, pressure can build up in the fire-resistant interlayer between the panes. This problem may occur in any fire-resistant interlayer which is intumescent (i.e. swells because of heat exposure) or produces gas when heated, and is a particular issue for gel interlayers which release water vapour in a fire. This water vapour is then itself heated resulting in high pressure steam between the glazing panes.

A high pressure between the panes means that when the fire side pane cracks due to heat shock, a relatively large amount of stored energy is released. Such an energy release can in particular circumstances cause mechanisms forming part of the glazing system to fail, with a concomitant loss of fire protection. For example, where the glazing system is a door, the door may open, or its hinges may detach, causing the door to fail. Alternatively, clips, beading or other fixings used in the glazing system may come loose, severely affecting its ability to resist fire.

Some efforts have been made to address the above issues. U.S. Patent Publication No. 2013/0196091 [SAINT GOBAIN] mentions a fire proof glazing comprising one or more glazing panes containing a defined local weakness. It is suggested that if pressure increases between the panes during a fire, these weaknesses may cause the fire side pane to break early, venting built up pressure.

However, glazing units that comprise a defined local weakness in one or more panes are inherently less durable than normal units, and may fail more easily during manufacture, installation or normal use. For example, such panes may crack more easily, or develop other flaws that hamper the ability of the glazing unit to resist fire, reduce the unit's operational lifetime (e.g. by allowing the ingress of air and moisture which might cause decomposition of the fire-resistant interlayer) or blemish the visual appearance of the unit.

It is an object of the present invention to address these issues and provide a fire-resistant glazing unit which mitigates issues caused by pressure build up in the interlayer between the unit panes without compromising the structural integrity of the panes themselves, which are not only key contributors to the fire resistance of the glazing unit, but are relied on for support and visual effect.

SUMMARY

This specification describes, in part, a glazing unit comprising: a first pane and a second pane, which may be the same or different; a fire resistant interlayer between the panes; and a seal which together with the panes encloses the fire-resistant interlayer, wherein the seal is configured to breach in the event of increased pressure between the first and second panes.

This specification also describes, in part, a process for the manufacture of a glazing unit comprising a first pane and a second pane, which may be the same or different, a fire resistant interlayer between the panes, and a seal which together with the panes encloses the fire-resistant interlayer, the seal being configured to breach in the event of increased pressure between the first and second panes, the process comprising: (a) providing a first and a second pane; (b) partially assembling the glazing unit by spacing apart the first and second panes and holding them in position with a seal which is configured to breach in the event of increased pressure between the first and second panes in the completed unit, the seal comprising an opening and together with the panes defining an internal space; (c) delivering a fire-resistant material into the internal space through the opening in the seal; and (d) closing the opening in the seal to enclose the fire-resistant interlayer.

This specification also describes, in part, the use of a glazing unit comprising: a first pane and a second pane, which may be the same or different; a fire resistant interlayer between the panes; and a seal which together with the panes encloses the fire-resistant interlayer, wherein the seal is configured to breach in the event of increased pressure between the first and second panes, in construction.

This specification also describes, in part, a construction comprising a glazing unit comprising: a first pane and a second pane, which may be the same or different; a fire resistant interlayer between the panes; and a seal which together with the panes encloses the fire-resistant interlayer, wherein the seal is configured to breach in the event of increased pressure between the first and second panes.

ILLUSTRATIVE EMBODIMENTS

Many embodiments of the invention are detailed throughout the specification and will be apparent to a reader skilled in the art. The invention is not to be interpreted as being limited to any of the recited embodiments.

The first embodiment is a glazing unit comprising: a first pane and a second pane, which may be the same or different; a fire resistant interlayer between the panes; and a seal which together with the panes encloses the fire-resistant interlayer, wherein the seal is configured to breach in the event of increased pressure between the first and second panes.

"A" means "at least one". In any embodiment where "a" is used to denote a given material or element, "a" may mean one.

"Comprising" means that a given material or element may contain other materials or elements. In any embodiment where "comprising" is mentioned the given material or element may be formed of at least 10% w/w, at least 20% w/w, at least 30% w/w, or at least 40% w/w of the material or element. In any embodiment where "comprising" is mentioned, "comprising" may also mean "consisting of" (or "consists of") or "consisting essentially of" (or "consists essentially of") a given material or element.

"Consisting of" or "consists of" means that a given material or element is formed entirely of the material or element. In any embodiment where "consisting of" or "consists of" is mentioned the given material or element may be formed of 100% w/w of the material or element.

"Consisting essentially of" or "consists essentially of" means that a given material or element consists almost entirely of that material or element. In any embodiment where "consisting essentially of" or "consists essentially of" is mentioned the given material or element may be formed of at least 50% w/w, at least 60% w/w, at least 70% w/w, at least 80% w/w, at least 90% w/w, at least 95% w/w or at least 99% w/w of the material or element.

In any embodiment where "is" or "may be" is used to define a material or element, "is" or "may be" may mean the material or element "consists of" or "consists essentially of" the material or element.

Claims are embodiments.

Seals

A "seal" is any element or means which can be arranged with at least two panes (for example a first pane and a second pane) to define an internal space. Such internal spaces may comprise a fire-resistant interlayer, or alternatively they may be left empty, evacuated, or filled with an alternative substance (e.g. an insulating gas, which may result in an insulating fire-resistant glazing unit).

Seals may be any suitable dimension, for example elongate. Seals may be flexible and may be moulded into any desired shape, for example being adapted to complement a given pane or glazing unit geometry (for example being substantially rectangular where the pane or glazing unit is rectangular).

When a seal "encloses" an element (such as a fire-resistant interlayer) it may mean that the element is held in an essentially air tight internal space such that release of a gas in the internal space (for example the fire-resistant interlayer) leads to the generation of increased pressure in the internal space (for example the fire-resistant interlayer).

In any embodiment where a seal is mentioned, the seal may be essentially air tight. An essentially air tight seal is one that permits only minimal gas exchange, such that if increased pressure is generated in the internal space or fire-resistant interlayer the seal encloses, there is a pressure build up. An air tight seal encloses an air tight element.

In any embodiment where a seal is mentioned, the seal may be air tight. An air tight seal permits no measurable gas exchange.

In any embodiment where a seal is mentioned, the seal may be non-porous.

Essentially air tight, air tight and non-porous seals do not permit (or may essentially prevent) the ingress of air or moisture which may affect elements enclosed in an internal space, for example a fire-resistant interlayer. This may extend the operational life of the enclosed element (for example a fire-resistant interlayer).

A seal may be "configured to breach in the event of increased pressure between the first and second panes" in any of several ways, each of which may independently feature in any embodiment. A seal "breach" opens the internal space (for example the fire-resistant interlayer) enclosed by the seal to the surrounding atmosphere, permitting pressure to be vented.

In any embodiment where a breach is mentioned, the breach may be a tear or mechanical failure.

In any embodiment where the seal is configured to breach in the event of increased pressure between the first and second panes, the seal may be configured to breach in the event of increased pressure between the first and second panes caused by the action of heat (for example heat on a fire side pane). A seal may comprise any suitable material known in the art.

In any embodiment where a seal is mentioned, the seal may comprise a polysulphide polymer.

In any embodiment where a seal is mentioned, the seal may comprise a polyurethane polymer.

In any embodiment where a seal is mentioned, the seal may comprise a butyl polymer.

In any embodiment where a seal is mentioned, the seal may comprise a silicone polymer.

In any embodiment where a seal is mentioned, the seal may comprise a silyl modified polyether polymer (i.e. an MS polymer).

In any embodiment where a seal is mentioned, the seal may comprise a silyl modified polyurethane polymer (i.e. a SPUR polymer).

In any embodiment where a seal is mentioned, the seal may comprise a polysulphide polymer, a polyurethane polymer, a butyl polymer, a silicone polymer, a silyl modified polyether polymer or a silyl modified polyurethane polymer.

In any embodiment where a seal is mentioned, the seal may consist essentially of a polysulphide polymer.

In any embodiment where a seal is mentioned, the seal may consist essentially of a polyurethane polymer.

In any embodiment where a seal is mentioned, the seal may consist essentially of a butyl polymer.

In any embodiment where a seal is mentioned, the seal may consist essentially of a hot melt butyl polymer.

In any embodiment where a seal is mentioned, the seal may consist essentially of a silicone polymer.

In any embodiment where a seal is mentioned, the seal may consist essentially of a silyl modified polyether polymer.

In any embodiment where a seal is mentioned, the seal may consist essentially of a polysulphide polymer, a polyurethane polymer, a butyl polymer, a silicone polymer or a silyl.

Seals may be positioned in any suitable position relative to the outer edge of the panes they are arranged with. Panes may overlap or overhang a seal.

In any embodiment where a seal is mentioned, the seal may be a peripheral seal.

"Peripheral" means that a given element (for example a seal) is in the edge region of an element (for example a pane or glazing unit). For example, a peripheral seal may not occupy a space more than 1 cm, 2 cm, 3 cm, 4 cm or 5 cm inward from the outer edge of a pane or glazing unit, or may not extend inward from the outer edge of a pane more than 1%, 5%, 10% or 20% of the corresponding width or height of the pane or glazing unit.

In any embodiment where a seal is mentioned, the seal may be a perimeter seal.

A "perimeter seal" is one which extends along the outer edge of at least one pane, for example both panes where there is a first pane and a second pane. Such a seal provides additional protection for the edges of the pane, which helps maintain the integrity of the pane during normal use. A perimeter seal may enclose the outer edge of at least one pane, for example both panes where there is a first pane and a second pane.

In any embodiment where a seal is mentioned, the seal may be a perimeter seal which encloses the outer edge of any pane (for example a first pane and a second pane).

Any embodiment may comprise a plurality of seals, for example a first (or primary) seal and a second (or secondary) seal.

In one embodiment there is provided a glazing unit comprising: a first pane and a second pane, which may be the same or different; a fire resistant interlayer between the panes; a first seal which together with the panes encloses the fire-resistant interlayer; and a second seal enclosing the first seal, wherein both seals are configured to breach in the event of increased pressure between the first and second panes.

A first (or primary) seal together with a first pane and a second pane may enclose a fire-resistant interlayer.

A second (or secondary) seal together with a first pane and a second pane may enclose a first (or primary) seal.

In any embodiment where there is a plurality of seals, for example a first seal and a second seal, all (for example both) seals may be configured to breach in the event of increased pressure between the first and second panes.

In any embodiment where there is a first seal, the first seal may comprise acrylonitrile butadiene styrene and butyl polymer.

In any embodiment where there is a first seal, the first seal may consist essentially of acrylonitrile butadiene styrene which is sealingly connected to a first pane and a second pane using butyl polymer. Such a first seal fulfils the dual purpose of enclosing the fire-resistant interlayer to protect it from environmental effects like the ingress of air and moisture while also acting as a spacer.

A seal may be "configured to breach in the event of increased pressure between the first and second panes" due to its physical properties, which may be tuned such that it can perform as a seal during normal use (for example preventing the ingress of air or moisture into the internal space it encloses, and otherwise ensuring sealed glazing units meet criteria set out in EN 1279-4) but nevertheless breach when subjected to mechanical strain, such as strain resulting from increased pressure on the seal (e.g. pressure generated during a fire).

The suitability of the physical properties of the seal can be defined using various parameters and combinations of those parameters. Example parameters that can be used alone or in combination to show that a seal is "configured to breach in the event of increased pressure between the first and second panes" include Shore A hardness, thermal stability, maximum elongation, tensile strength and thermogravimetric weight loss.

In any embodiment where a seal is mentioned, the seal may be characterised by a Shore A hardness of about <45.

Shore A hardness is a measure of the resistance of a material to indentation. A Shore A durometer is used to determine this property. For rubbery materials, when the indenter is applied, a reading between 0 and 100 is obtained. When a complete penetration of the material is achieved, a reading of 0 is recorded. If no penetration of the material is achieved, a reading of 100 is recorded. This way, a dimensionless relative hardness of the material is measured. DIN ISO 7619-1 is a harmonised standard for measuring Shore A Hardness. In any embodiment where Shore A hardness is mentioned, the Shore A hardness may be measured according to the description in the experimental section.

In any embodiment of this specification where "about" is mentioned, "about" may mean +/−0 (i.e. no variance), +/−0.01, +/−0.1, +/−0.5, +/−1, +/−2, +/−5, +/−10, +/−20, +/−50, +/−100, +/−500 or +/−1000 units.

In any embodiment where a seal is mentioned, the seal may be characterised by a Shore A hardness of about <40.

In any embodiment where a seal is mentioned, the seal may be characterised by a Shore A hardness of about <35.

In any embodiment where a seal is mentioned, the seal may be characterised by a Shore A hardness of about 10 to about 45.

In any embodiment where a seal is mentioned, the seal may be characterised by a Shore A hardness of about 15-about 30.

In any embodiment where a seal is mentioned, the seal may be characterised by a Shore A hardness of about 25.

In any embodiment where a seal is mentioned, the seal may comprise a polymer characterised by a Shore A hardness of about <45.

In any embodiment where a seal is mentioned, the seal may comprise a polymer characterised by a Shore A hardness of about <40.

In any embodiment where a seal is mentioned, the seal may comprise a polymer characterised by a Shore A hardness of about <35.

In any embodiment where a seal is mentioned, the seal may comprise a polymer characterised by a Shore A hardness of about 10-about 45.

In any embodiment where a seal is mentioned, the seal may comprise a polymer characterised by a Shore A hardness of about 15-about 30.

In any embodiment where a seal is mentioned, the seal may comprise a polymer characterised by a Shore A hardness of about 25.

In any embodiment where a seal is mentioned, the seal may comprise a polymer characterised by a Shore A hardness of <45.

In any embodiment where a seal is mentioned, the seal may comprise a polymer characterised by a Shore A hardness of <40.

In any embodiment where a seal is mentioned, the seal may comprise a polymer characterised by a Shore A hardness of <35.

In any embodiment where a seal is mentioned, the seal may comprise a polymer characterised by a Shore A hardness of 10-45.

In any embodiment where a seal is mentioned, the seal may comprise a polymer characterised by a Shore A hardness of 15-30.

In any embodiment where a seal is mentioned, the seal may comprise a polymer characterised by a Shore A hardness of 25.

In any embodiment where a seal is mentioned, the seal may consist essentially of a polymer characterised by a Shore A hardness of about <45.

In any embodiment where a seal is mentioned, the seal may consist essentially of a polymer characterised by a Shore A hardness of about <40.

In any embodiment where a seal is mentioned, the seal may consist essentially of a polymer characterised by a Shore A hardness of about <35.

In any embodiment where a seal is mentioned, the seal may consist essentially of a polymer characterised by a Shore A hardness of about 10-about 45.

In any embodiment where a seal is mentioned, the seal may consist essentially of a polymer characterised by a Shore A hardness of about 15-about 30.

In any embodiment where a seal is mentioned, the seal may consist essentially of a polymer characterised by a Shore A hardness of about 25.

In any embodiment where a seal is mentioned, the seal may consist essentially of a polymer characterised by a Shore A hardness of <45.

In any embodiment where a seal is mentioned, the seal may consist essentially of a polymer characterised by a Shore A hardness of <40.

In any embodiment where a seal is mentioned, the seal may consist essentially of a polymer characterised by a Shore A hardness of <35.

In any embodiment where a seal is mentioned, the seal may consist essentially of a polymer characterised by a Shore A hardness of 10-45.

In any embodiment where a seal is mentioned, the seal may consist essentially of a polymer characterised by a Shore A hardness of 15-30.

In any embodiment where a seal is mentioned, the seal may consist essentially of a polymer characterised by a Shore A hardness of 25.

In any embodiment where Shore A hardness is mentioned, the Shore a hardness may be measured at room temperature.

In any embodiment where room temperature is mentioned, the room temperature may be about 20-about 30° C., about 20-about 27° C., about 20-about 25° C., about 20° C., about 25° C. or about 22° C.

In any embodiment where a seal is mentioned, the seal may comprise a polymer characterised by a Shore A hardness of about <45 at room temperature.

In any embodiment where a seal is mentioned, the seal may comprise a polymer characterised by a Shore A hardness of about <40 at room temperature.

In any embodiment where a seal is mentioned, the seal may comprise a polymer characterised by a Shore A hardness of about <35 at room temperature.

In any embodiment where a seal is mentioned, the seal may comprise a polymer characterised by a Shore A hardness of about 10-about 45 at room temperature.

In any embodiment where a seal is mentioned, the seal may comprise a polymer characterised by a Shore A hardness of about 15-about 30 at room temperature.

In any embodiment where a seal is mentioned, the seal may comprise a polymer characterised by a Shore A hardness of about 25 at room temperature.

In one embodiment there is provided a glazing unit comprising: a first pane and a second pane, which may be the same or different; a fire resistant interlayer between the panes; and a seal which together with the panes encloses the fire-resistant interlayer, wherein the seal is characterised by a Shore A hardness of about <45, about <40, about <35, about 10 to about 45, about 15-about 30, or about 25.

In one embodiment there is provided a glazing unit comprising: a first pane and a second pane, which may be the same or different; a fire resistant interlayer between the panes; and a seal which together with the panes encloses the fire-resistant interlayer, wherein the seal comprises a polymer characterised by a Shore A hardness of about <45, about <40, about <35, about 10 to about 45, about 15-about 30, or about 25.

In one embodiment there is provided a glazing unit comprising: a first pane and a second pane, which may be the same or different; a fire resistant interlayer between the panes; and a seal which together with the panes encloses the fire-resistant interlayer, wherein the seal consists essentially of a polymer characterised by a Shore A hardness of about <45, about <40, about <35, about 10 to about 45, about 15-about 30, or about 25.

In any embodiment where a seal is mentioned, the seal may be characterised by a maximum tensile elongation of about <70%.

Maximum tensile elongation is achieved after a material has been stretched under tensile conditions at the time of failure (or breakage). During the elongation process, the dimensions of the material change (strain) due to changes in the material's viscoelastic properties. A tensile tester is used for this purpose and tests can be carried out at room temperature (for example 22° C.) or using an environmental chamber. In any embodiment where maximum tensile elongation hardness is mentioned, the maximum tensile elongation may be measured according to the description in the experimental section.

In any embodiment where a seal is mentioned, the seal may be characterised by a maximum tensile elongation of about <60%.

In any embodiment where a seal is mentioned, the seal may be characterised by a maximum tensile elongation of about <35%.

In any embodiment where a seal is mentioned, the seal may be characterised by a maximum tensile elongation of about 5%-about 70%.

In any embodiment where a seal is mentioned, the seal may be characterised by a maximum tensile elongation of about 5%-about 35%.

In any embodiment where a seal is mentioned, the seal may comprise a polymer characterised by a maximum tensile elongation of about <70%.

In any embodiment where a seal is mentioned, the seal may comprise a polymer characterised by a maximum tensile elongation of about <60%.

In any embodiment where a seal is mentioned, the seal may comprise a polymer characterised by a maximum tensile elongation of about <35%.

In any embodiment where a seal is mentioned, the seal may comprise a polymer characterised by a maximum tensile elongation of about 5%-about 70%.

In any embodiment where a seal is mentioned, the seal may comprise a polymer characterised by a maximum tensile elongation of about 5-about 35%.

In any embodiment where a seal is mentioned, the seal may comprise a polymer characterised by a maximum tensile elongation of <70%.

In any embodiment where a seal is mentioned, the seal may comprise a polymer characterised by a maximum tensile elongation of <60%.

In any embodiment where a seal is mentioned, the seal may comprise a polymer characterised by a maximum tensile elongation of <35%.

In any embodiment where a seal is mentioned, the seal may comprise a polymer characterised by a maximum tensile elongation of 5%-70%.

In any embodiment where a seal is mentioned, the seal may comprise a polymer characterised by a maximum tensile elongation of 5%-35%.

In any embodiment where a seal is mentioned, the seal may consist essentially of a polymer characterised by a maximum tensile elongation of about <70%.

In any embodiment where a seal is mentioned, the seal may consist essentially of a polymer characterised by a maximum tensile elongation of about <60%.

In any embodiment where a seal is mentioned, the seal may consist essentially of a polymer characterised by a maximum tensile elongation of about <35%.

In any embodiment where a seal is mentioned, the seal may consist essentially of a polymer characterised by a maximum tensile elongation of about 5%-about 70%.

In any embodiment where a seal is mentioned, the seal may consist essentially of a polymer characterised by a maximum tensile elongation of about 5%-about 35%.

In any embodiment where a seal is mentioned, the seal may consist essentially of a polymer characterised by a maximum tensile elongation of <70%.

In any embodiment where a seal is mentioned, the seal may consist essentially of a polymer characterised by a maximum tensile elongation of <60%.

In any embodiment where a seal is mentioned, the seal may consist essentially of a polymer characterised by a maximum tensile elongation of <35%.

In any embodiment where a seal is mentioned, the seal may consist essentially of a polymer characterised by a maximum tensile elongation of 5%-70%.

In any embodiment where a seal is mentioned, the seal may consist essentially of a polymer characterised by a maximum tensile elongation of 5%-35%.

In any embodiment where a maximum tensile elongation is mentioned, the maximum tensile elongation may be at room temperature.

In any embodiment where a seal is mentioned, the seal may be characterised by a maximum tensile elongation of about 70% at room temperature.

In any embodiment where a seal is mentioned, the seal may be characterised by a maximum tensile elongation of about 60% at room temperature.

In any embodiment where a seal is mentioned, the seal may be characterised by a maximum tensile elongation of about 35% at room temperature.

In any embodiment where a seal is mentioned, the seal may be characterised by a maximum tensile elongation of about 5-35% at room temperature.

In any embodiment where a seal is mentioned, the seal may comprise a polymer characterised by a maximum tensile elongation of about 70% at room temperature.

In any embodiment where a seal is mentioned, the seal may comprise a polymer characterised by a maximum tensile elongation of about 60% at room temperature.

In any embodiment where a seal is mentioned, the seal may comprise a polymer characterised by a maximum tensile elongation of about 35% at room temperature.

In any embodiment where a seal is mentioned, the seal may comprise a polymer characterised by a maximum tensile elongation of about 5-about 35% at room temperature.

In one embodiment there is provided a glazing unit comprising: a first pane and a second pane, which may be the same or different; a fire resistant interlayer between the panes; and a seal which together with the panes encloses the fire-resistant interlayer, wherein the seal is characterised by a maximum tensile elongation of about <70%, about <60%, about <35%, about 5%-70% or about 5%-about 35%.

In one embodiment there is provided a glazing unit comprising: a first pane and a second pane, which may be the same or different; a fire resistant interlayer between the panes; and a seal which together with the panes encloses the fire-resistant interlayer, wherein the seal comprises a polymer characterised by a maximum tensile elongation of about <70%, about <60%, about <35%, about 5%-70% or about 5%-about 35%.

In one embodiment there is provided a glazing unit comprising: a first pane and a second pane, which may be the same or different; a fire resistant interlayer between the panes; and a seal which together with the panes encloses the fire-resistant interlayer, wherein the seal consists essentially of a polymer characterised by a maximum tensile elongation of about <70%, about <60%, about <35%, about 5%-70% or about 5%-about 35%.

In any embodiment where a seal is mentioned, the seal may be characterised by a loss of thermal stability at about <250° C.

Loss of thermal stability can be observed for example using oscillation rheology. Rheometers are used to study the properties of a material under strain. Loss of stability can be seen for example when there is a sharp increase in loss of modulus ("G") at a given temperature, indicating a transition toward more liquid like behaviour. In any embodiment where a loss of thermal stability is mentioned, the loss of thermal stability may be measured according to the description in the experimental section.

In any embodiment where a seal is mentioned, the seal may be characterised by a loss of thermal stability at about <200° C.

In any embodiment where a seal is mentioned, the seal may be characterised by a loss of thermal stability at about 150° C.-about 250° C.

In any embodiment where a seal is mentioned, the seal may comprise a polymer characterised by a loss of thermal stability at about <250° C.

In any embodiment where a seal is mentioned, the seal may comprise a polymer characterised by a loss of thermal stability at about <200° C.

In any embodiment where a seal is mentioned, the seal may comprise a polymer characterised by a loss of thermal stability at about 150° C.-about 250° C.

In any embodiment where a seal is mentioned, the seal may comprise a polymer characterised by a loss of thermal stability <250° C.

In any embodiment where a seal is mentioned, the seal may comprise a polymer characterised by a loss of thermal stability <200° C.

In any embodiment where a seal is mentioned, the seal may comprise a polymer characterised by a loss of thermal stability at 150° C.-250° C.

In any embodiment where a loss of thermal stability is mentioned, the loss of thermal stability may be as shown in an oscillation rheology test.

In any embodiment where a seal is mentioned, the seal may be characterised by a loss of thermal stability at about <250° C. as shown in an oscillation rheology test.

In any embodiment where a seal is mentioned, the seal may be characterised by a loss of thermal stability at about <200° C. as shown in an oscillation rheology test.

In any embodiment where a seal is mentioned, the seal may be characterised by a loss of thermal stability at about 150° C.-about 250° C. as shown in an oscillation rheology test.

In any embodiment where a seal is mentioned, the seal may comprise a polymer characterised by a loss of thermal stability at about <250° C. as shown in an oscillation rheology test.

In any embodiment where a seal is mentioned, the seal may comprise a polymer characterised by a loss of thermal stability at about <200° C. as shown in an oscillation rheology test.

In any embodiment where a seal is mentioned, the seal may comprise a polymer characterised by a loss of thermal stability at about 150° C.-about 250° C. as shown in an oscillation rheology test.

In one embodiment there is provided a glazing unit comprising: a first pane and a second pane, which may be the same or different; a fire resistant interlayer between the panes; and a seal which together with the panes encloses the fire-resistant interlayer, wherein the seal is characterised by a loss of thermal stability at about <250° C., about <200° C., or about 150° C.-about 250° C.

In one embodiment there is provided a glazing unit comprising: a first pane and a second pane, which may be the same or different; a fire resistant interlayer between the panes; and a seal which together with the panes encloses the fire-resistant interlayer, wherein the seal comprises a polymer characterised by a loss of thermal stability at about <250° C., about <200° C., or about 150° C.-about 250° C.

In one embodiment there is provided a glazing unit comprising: a first pane and a second pane, which may be the same or different; a fire resistant interlayer between the panes; and a seal which together with the panes encloses the fire-resistant interlayer, wherein the seal consists essentially of a polymer characterised by a loss of thermal stability at about <250° C., about <200° C., or about 150° C.-about 250° C.

In any embodiment where a seal is mentioned, the seal may be characterised by a tensile strength of about <0.6 MPa.

The tensile strength of a material provides a measure of the amount of force (or stress) that is required to pull a material under controlled conditions until the material breaks. Characterisation data obtained from tensile strength measurement provides information on how the material can behave under different conditions of loading/tension. In any embodiment where tensile strength is mentioned, the tensile strength may be measured according to the description in the experimental section.

In any embodiment where a seal is mentioned, the seal may be characterised by a tensile strength of about 0.3 MPa-about 0.6 MPa.

In any embodiment where a seal is mentioned, the seal may comprise a polymer characterised by a tensile strength of about <0.6 MPa.

In any embodiment where a seal is mentioned, the seal may comprise a polymer characterised by a tensile strength of about 0.3 MPa-about 0.6 MPa.

In any embodiment where a seal is mentioned, the seal may comprise a polymer characterised by a tensile strength <0.6 MPa.

In any embodiment where a seal is mentioned, the seal may comprise a polymer characterised by a tensile strength of 0.3 MPa-0.6 MPa.

In any embodiment where a seal is mentioned, the seal may consist essentially of a polymer characterised by a tensile strength of about <0.6 MPa.

In any embodiment where a seal is mentioned, the seal may consist essentially of a polymer characterised by a tensile strength of about 0.3 MPa-about 0.6 MPa.

In any embodiment where a seal is mentioned, the seal may consist essentially of a polymer characterised by a tensile strength of <0.6 MPa.

In any embodiment where a seal is mentioned, the seal may consist essentially of a polymer characterised by a tensile strength of 0.3 MPa-0.6 MPa.

In any embodiment where a tensile strength is mentioned, the tensile strength may be at room temperature.

In any embodiment where a seal is mentioned, the seal may be characterised by a tensile strength of about <0.6 MPa at room temperature.

In any embodiment where a seal is mentioned, the seal may be characterised by a tensile strength of about 0.3 MPa-about 0.6 MPa at room temperature.

In any embodiment where a seal is mentioned, the seal may comprise a polymer characterised by a tensile strength of about <0.6 MPa at room temperature.

In any embodiment where a seal is mentioned, the seal may comprise a polymer characterised by a tensile strength of about 0.3 MPa-about 0.6 MPa at room temperature.

In any embodiment where a seal is mentioned, the seal may comprise a polymer characterised by a tensile strength <0.6 MPa at room temperature.

In any embodiment where a seal is mentioned, the seal may comprise a polymer characterised by a tensile strength of 0.3 MPa-0.6 MPa at room temperature.

In one embodiment there is provided a glazing unit comprising: a first pane and a second pane, which may be the same or different; a fire resistant interlayer between the panes; and a seal which together with the panes encloses the fire-resistant interlayer, wherein the seal is characterised by a tensile strength of about <0.6 MPa or about 0.3 MPa-about 0.6 MPa.

In one embodiment there is provided a glazing unit comprising: a first pane and a second pane, which may be the same or different; a fire resistant interlayer between the panes; and a seal which together with the panes encloses the fire-resistant interlayer, wherein the seal comprises a polymer characterised by a tensile strength of about <0.6 MPa or about 0.3 MPa-about 0.6 MPa.

In one embodiment there is provided a glazing unit comprising: a first pane and a second pane, which may be the same or different; a fire resistant interlayer between the panes; and a seal which together with the panes encloses the fire-resistant interlayer, wherein the seal consists essentially of a polymer characterised by a tensile strength of about <0.6 MPa or about 0.3 MPa-about 0.6 MPa.

In any embodiment where a seal is mentioned, the seal may be characterised by a weight loss of about 5%-about 50% as measured at 250° C.

Thermogravimetric analysis (TGA) can be used to quantify weight loss at a given temperature. In any embodiment where a weight loss is mentioned, the weight loss may be quantified using thermogravimetric analysis.

Thermogravimetric analysis is a widely used method where the weight loss (or weight gain) in a material is measured under controlled conditions, as a function of either temperature or time. The material is heated in an air atmosphere typically from room temperature to a temperature above its decomposition temperature. Weight loss patterns as function of time or temperature are then correlated with the material's thermal stability, loss of solvent components, loss of additive components, loss of functional groups or decomposition.

In any embodiment where a seal is mentioned, the seal may be characterised by a weight loss of about 5%-about 10% or about 20%-about 40% as measured at 250° C.

In any embodiment where a seal is mentioned, the seal may be characterised by a weight loss lower limit of about 5%, about 10%, about 20%, about 30% or about 40%-a weight loss upper limit of about 50% as measured at 250° C.

In any embodiment where a seal is mentioned, the seal may comprise a polymer characterised by a weight loss of about 5%-about 50% as measured at 250° C.

In any embodiment where a seal is mentioned, the seal may comprise a polymer characterised by a weight loss of about 5%-about 10% or about 20%-about 40% as measured at 250° C.

In any embodiment where a seal is mentioned, the seal may comprise a polymer characterised by a weight loss lower limit of about 5%, about 10%, about 20%, about 30% or about 40%-a weight loss upper limit of about 50% as measured at 250° C.

In any embodiment where a seal is mentioned, the seal may comprise a polymer characterised by a weight loss of about 5%-about 50% as measured at 250° C.

In any embodiment where a seal is mentioned, the seal may comprise a polymer characterised by a weight loss of about 5%-about 10% or about 20%-about 40% as measured at 250° C.

In any embodiment where a seal is mentioned, the seal may comprise a polymer characterised by a weight loss lower limit of about 5%, about 10%, about 20%, about 30% or about 40%-a weight loss upper limit of about 50% as measured at 250° C.

In any embodiment where a seal is mentioned, the seal may consist essentially of a polymer characterised by a weight loss of about 5%-about 50% as measured at 250° C.

In any embodiment where a seal is mentioned, the seal may consist essentially of a polymer characterised by a weight loss of about about 5%-about 10% or 20%-about 40% as measured at 250° C.

In any embodiment where a seal is mentioned, the seal may consist essentially of a polymer characterised by a weight loss lower limit of about 5%, about 10%, about 20%, about 30% or about 40%-a weight loss upper limit of about 50% as measured at 250° C.

In any embodiment where a seal is mentioned, the seal may consist essentially of a polymer characterised by a weight loss of about 5%-about 50% as measured at 250° C.

In any embodiment where a seal is mentioned, the seal may consist essentially of a polymer characterised by a weight loss of about 5%-about 10% or about 20%-about 40% as measured at 250° C.

In any embodiment where a seal is mentioned, the seal may consist essentially of a polymer characterised by a weight loss lower limit of about 5%, about 10%, about 20%, about 30% or about 40%-a weight loss upper limit of about 50% as measured at 250° C.

In one embodiment there is provided a glazing unit comprising: a first pane and a second pane, which may be the same or different; a fire resistant interlayer between the panes; and a seal which together with the panes encloses the fire-resistant interlayer, wherein the seal is characterised by a weight loss of about 5%-50% as measured at 250° C., a weight loss of about 5%-about 10% as measured at 250° C., a weight loss of about 20%-about 40% as measured at 250° C., or a weight loss lower limit of about 5%, about 10%, about 20%, about 30% or about 40%-a weight loss upper limit of about 50% as measured at 250° C.

In one embodiment there is provided a glazing unit comprising: a first pane and a second pane, which may be the same or different; a fire resistant interlayer between the panes; and a seal which together with the panes encloses the fire-resistant interlayer, wherein the seal comprises a polymer characterised by a weight loss of about 5%-about 50% as measured at 250° C., a weight loss of about 5%-about 10% as measured at 250° C., a weight loss of about 20%-about 40% as measured at 250° C., or a weight loss of about 5%, about 10%, about 20%, about 30% or about 40%-about 50% as measured at 250° C.

In one embodiment there is provided a glazing unit comprising: a first pane and a second pane, which may be the same or different; a fire resistant interlayer between the panes; and a seal which together with the panes encloses the fire-resistant interlayer, wherein the seal consists essentially of a polymer characterised by a weight loss of about 5%-about 50% as measured at 250° C., a weight loss of about 20%-about 40% as measured at 250° C., or a weight loss of about 5%, about 10%, about 20%, about 30% or about 40%-about 50% as measured at 250° C.

In any embodiment where a seal is mentioned, the seal may be characterised by: a Shore A hardness of about 10 to about 45; a maximum tensile elongation of about 5%-about 70%; a loss of thermal stability at about 150° C.-about 250° C.; a tensile strength of about <0.6 MPa; and/or a weight loss of about 5%-about 50% as measured at 250° C.

In any embodiment where a seal is mentioned, the seal may comprise a polymer characterised by: a Shore A hardness of about 10 to about 45; a maximum tensile elongation of about 5%-about 70%; a loss of thermal stability at about 150° C.-about 250° C.; a tensile strength of about <0.6 MPa; and/or a weight loss of about 5%-about 50% as measured at 250° C.

In any embodiment where a seal is mentioned, the seal may comprise a polymer characterised by: a Shore A hardness of 10-45; a maximum tensile elongation of 5%-70%; a loss of thermal stability at 150° C.-250° C.; a tensile strength of <0.6 MPa; and/or a weight loss of 5%-50% as measured at 250° C.

In any embodiment where a seal is mentioned, the seal may consist essentially of a polymer characterised by: a Shore A hardness of about 10 to about 45; a maximum tensile elongation of about 5%-about 70%; a loss of thermal stability at about 150° C.-about 250° C.; a tensile strength of about <0.6 MPa; and/or a weight loss of about 5%-about 50% as measured at 250° C.

In any embodiment where a seal is mentioned, the seal may consist essentially of a polymer characterised by: a Shore A hardness of 10-45; a maximum tensile elongation of 5%-70%; a loss of thermal stability at 150° C.-250° C.; a tensile strength of <0.6 MPa; and/or a weight loss of 5%-50% as measured at 250° C.

In any embodiment where a seal is mentioned, the seal may be characterised by: a Shore A hardness of 10-30; a maximum tensile elongation of 5%-35%; a loss of thermal stability at 150-200° C.; a tensile strength of 0.3 MPa-0.6 MPa; and/or a weight loss of 5%-50% as measured at 250° C.

In any embodiment where a seal is mentioned, the seal may comprise a polymer characterised by: a Shore A hardness of 10-30; a maximum tensile elongation of 5%-35%; a loss of thermal stability at 150-200° C.; a tensile strength of 0.3 MPa-0.6 MPa; and/or a weight loss of 5%-50% as measured at 250° C.

In any embodiment where a seal is mentioned, the seal may consist essentially of a polymer characterised by: a Shore A hardness of 10-30; a maximum tensile elongation of 5%-35%; a loss of thermal stability at 150-200° C.; a tensile strength of 0.3 MPa-0.6 MPa; and/or a weight loss of 5%-50% as measured at 250° C.

In any embodiment where a seal is mentioned, the seal may consist essentially of a polymer characterised by: a Shore A hardness of 10-30; a maximum tensile elongation of 5%-35%; a loss of thermal stability at 150-200° C.; a tensile strength of 0.3 MPa-0.6 MPa; and/or a weight loss of 5%-50% as measured at 250° C.

In any embodiment where a seal is mentioned, the seal may consist essentially of a polymer characterised by: a Shore A hardness of any range described herein; a maximum tensile elongation of any range described herein; a loss of thermal stability at any range described herein; a tensile strength of any range described herein; and/or a weight loss of any range described herein as measured at 250° C.

A seal may comprise a single continuous piece of material, or comprise a plurality of individual members or sections ("inserts"), suitably connected to produce an overall seal. Some or all of such individual members or sections (or inserts) may be sealingly connected, and/or sealingly connected to the relevant panes (for example using butyl polymer). Any seal that is not comprised of individual members or sections (or inserts) may also be sealingly connected to the panes with which it encloses an internal space or fire-resistant interlayer. "Sealingly connected" means that an element is bonded to another element in such a fashion as to maintain the overall structural integrity of the composite element under normal conditions of use (e.g. at ambient temperature and pressure). Elements that are sealingly connected may form an air tight seal.

A seal may be "configured to breach in the event of increased pressure between the first and second panes" by providing the seal with an individual member or section that comprises a suitable thermoplastic (for example a butyl polymer) or a suitable thermosetting plastic (for example a nylon polymer). When a seal comprising an individual member comprising a suitable thermoplastic (such as a butyl polymer insert) is exposed to a fire, the member softens and breaks easily, exposing the internal space or fire-resistant interlayer enclosed by the seal to the surrounding atmosphere, and releasing any pressure built up in the space or interlayer. Suitable thermosetting plastics such as nylon members do not form strong bonds with the remainder of a seal when sealingly connected, and are therefore "squeezed out" and ejected if there is a build-up of pressure in an interlayer.

In any embodiment where a seal is mentioned, the seal may comprise a section comprising a thermoplastic polymer or a thermosetting polymer.

In any embodiment where a seal is mentioned, the seal may comprise a section comprising a nylon polymer or a butyl polymer.

In any embodiment where a seal is mentioned, the seal may comprise a section consisting essentially of a nylon polymer or a butyl polymer.

In any embodiment where a seal is mentioned, the seal may comprise a section consisting essentially of a nylon polymer.

In any embodiment where a seal is mentioned, the seal may comprise a section consisting essentially of a butyl polymer.

In any embodiment where a seal is mentioned, the seal may comprise polysulphide polymer comprising a section comprising a nylon polymer or a butyl polymer.

In any embodiment where a seal is mentioned, the seal may comprise polysulphide polymer comprise a section consisting essentially of a nylon polymer or a butyl polymer.

In any embodiment where a seal is mentioned, the seal may comprise may comprise polysulphide polymer comprising a section consisting essentially of a nylon polymer.

In any embodiment where a seal is mentioned, the seal may comprise may comprise polysulphide polymer comprising a section consisting essentially of a butyl polymer.

In any embodiment where a seal comprising a section comprising (or consisting essentially of) a nylon polymer or a butyl polymer is mentioned, the section may constitute about 0.01% to about 10% of the overall length of the seal.

In any embodiment where a seal comprising a section comprising (or consisting essentially of) a nylon polymer or a butyl polymer is mentioned, the section may constitute about 0.1% to about 5% of the overall length of the seal.

In any embodiment where a seal comprising a section comprising (or consisting essentially of) a nylon polymer or a butyl polymer is mentioned, the section may constitute about 0.1% to about 1% of the overall length of the seal.

In any embodiment where a seal comprising a section comprising (or consisting essentially of) a nylon polymer or a butyl polymer is mentioned, the section may constitute about 0.1%, about 0.5%, about 1% about 5%, about 10%, about 20%, about 30%, about 40% or about 50% of the overall length of the seal.

In any embodiment where a seal comprising a section comprising (or consisting essentially of) a nylon polymer or a butyl polymer is mentioned, the section may have the same height and width as the rest of the seal.

A seal may be "configured to breach in the event of increased pressure between the first and second panes" by virtue of one or more shims. Shims are resistant to compression and are located between the panes of a glazing unit, for example at the corners. The presence of shims makes a seal more likely to break before a pane, so more durable seals can be configured to breach in the event of increased pressure between the first and second panes.

Without wishing to be bound by theory, it is thought that shims achieve these effects by resisting compression and so minimising the outward bowing of a hot side pane that occurs as a result of pressure build up in a fire; instead channelling the built-up pressure onto the seal, which causes it to breach before the pane can crack due to thermal shock.

In one embodiment there is provided a glazing unit comprising: a first pane and a second pane, which may be the same or different; a fire resistant interlayer between the panes; and a seal which together with the panes encloses the fire-resistant interlayer, wherein the glazing unit comprises a shim located between the panes.

In any embodiment where a shim is mentioned, the shim may comprise a thermosetting polymer (for example nylon).

In any embodiment where a shim is mentioned, the shim may consist essentially of a thermosetting polymer (for example nylon).

In any embodiment where a shim is mentioned, there may be 1, 2, 3, 4, 5 or 6 shims.

In any embodiment where a shim is mentioned, there may be more than 2 shims.

In any embodiment where a shim is mentioned, there may be more than 3 shims.

In any embodiment where a shim is mentioned, the shim may be located in a peripheral region of a glazing unit.

In any embodiment where a shim is mentioned, the shim may essentially abut at least one pane. When a shim essentially abuts at least one pane, the shim touches or nearly touches the pane.

In any embodiment where a shim is mentioned, the shim may essentially abut the panes.

In any embodiment where a shim is mentioned, the shim may be embedded in a seal.

In one embodiment there is provided a glazing unit comprising: a first pane and a second pane, which may be the same or different; a fire resistant interlayer between the panes; and a seal which together with the panes encloses the fire-resistant interlayer, wherein the glazing unit is rectangular and the seal is a perimeter seal comprising four shims embedded in it, one shim substantially in each corner of the seal and essentially abutting the first and second panes.

A seal may also be "configured to breach in the event of increased pressure between the first and second panes" by virtue of a local mechanical weakness, such as a notch or portion (for example a v-shaped portion) removed from the seal in one or more locations.

In one embodiment there is provided a glazing unit comprising: a first pane and a second pane, which may be the same or different; a fire resistant interlayer between the panes; and a seal which together with the panes encloses the fire-resistant interlayer, wherein the seal comprises a local mechanical weakness.

In any embodiment where a local mechanical weakness is mentioned, the local mechanical weakness may comprise a notch.

In any embodiment where a local mechanical weakness is mentioned, the local mechanical weakness may comprise a notch which is essentially v-shaped.

In any embodiment where a notch is mentioned, the notch may extend about 10%-about 50% from the outer edge of a seal.

In any embodiment where a notch is mentioned, the notch may extend about 30% from the outer edge of a seal.

Spacers

In one embodiment there is provided a glazing unit comprising: a first pane and a second pane, which may be the same or different; a fire resistant interlayer between the panes; a seal which together with the panes encloses the fire-resistant interlayer; and a spacer, wherein the seal is configured to breach in the event of increased pressure between the first and second panes.

A "spacer" is an element used to hold apart panes to help maintain the structural arrangement of a glazing unit, both during manufacture and normal use. Spacers may comprise any suitable material (for example a suitable polymer material) and may be reinforced to help them perform their function better. Spacers are located in the internal spaces defined by panes, for example internal spaces filled with a fire-resistant interlayer A seal (for example a primary seal) may perform the same function as a spacer, and vice versa. For example, a suitable spacer can both hold panes apart in a suitably opposed configuration and together with those panes define an internal space (one filled for example with a fire-resistant interlayer).

In any embodiment where a spacer is mentioned, the spacer may comprise acrylonitrile butadiene styrene, nylon, polytetrafluoroethylene, polypropylene, polyethylene, high density polyethylene, polyurethane, silicone, polyester, stainless steel, titanium or epoxy resin; or be a thermoplastic or thermosetting plastic spacer.

In any embodiment where a spacer is mentioned, the spacer may consist essentially of acrylonitrile butadiene styrene, nylon, polytetrafluoroethylene, polypropylene, polyethylene, high density polyethylene, polyurethane, silicone, polyester, stainless steel, titanium, or epoxy resin.

In any embodiment where a spacer is mentioned, the spacer may consist essentially of acrylonitrile butadiene styrene.

In any embodiment where a spacer is mentioned, the spacer may be a thermoplastic or a thermosetting plastic spacer.

In any embodiment where a spacer is mentioned, the spacer may be a thermoplastic spacer (for example a polyisobutylene spacer, such as IGK 611).

In any embodiment where a spacer is mentioned, the spacer may be a thermosetting plastic spacer.

In any embodiment where a spacer is mentioned, the spacer may be reinforced with glass fibre or glass particles.

Panes

A "pane" may comprise any suitable material, such as glass or a synthetic polymer (i.e. plastic, for example a polycarbonate polymer), or a combination of any such materials. Panes may be any suitable shape (for instance, square, rectangular, triangular, circular etc.), or may be dimensioned to suit the particular application, and shaped irregularly as required. Panes may be of varying thickness or size (e.g. perimeter size). Panes may adopt various curvatures (e.g. flat or arched) and may exhibit various degrees of transparency. Panes may be patterned or non-patterned, coloured or non-coloured. In any embodiment comprising more than one pane, panes may be the same or different.

In any embodiment where a pane is mentioned, the pane may be transparent.

In any embodiment where a pane is mentioned, the pane may be translucent. A translucent pane permits the transmission of light but diffuses it. An example of a translucent pane is a frosted pane.

In any embodiment where a pane is mentioned, the pane may be opaque.

In any embodiment where a pane is mentioned, the pane may be non-coloured.

In any embodiment where a pane is mentioned, the pane may be coloured.

In any embodiment where a pane is mentioned, the pane may be mirrored.

In any embodiment where a pane is mentioned, the pane may be patterned.

In any embodiment where a pane is mentioned, the pane may be extra white.

In any embodiment where a pane is mentioned, the pane may be ultra-clear.

In any embodiment where a pane is mentioned, the pane may be transparent, translucent, opaque, non-coloured, coloured, mirrored, patterned, extra white, or ultra-clear.

In any embodiment where a pane is mentioned, the pane may comprise a combination of regions which are independently transparent, translucent, opaque, non-coloured, coloured, mirrored, patterned, extra white, or ultra-clear.

In any embodiment where a pane is mentioned, the pane may comprise a synthetic polymer.

In any embodiment where a pane is mentioned, the pane may comprise a polycarbonate polymer.

In any embodiment where a pane is mentioned, the pane may comprise glass.

In any embodiment where a pane is mentioned, the pane may comprise borosilicate glass.

In any embodiment where a pane is mentioned, the pane may comprise annealed glass.

In any embodiment where a pane is mentioned, the pane may comprise toughened (i.e. tempered) glass. Toughened glass has the advantage of disintegrating into many small pieces when broken, reducing the risk of injury. It is also more resistant to thermal shock and therefore contributes to the fire-resistant properties of a glazing unit. Toughened glass may be thermally toughened or chemically toughened.

In any embodiment where a pane is mentioned, the pane may comprise thermally toughened glass.

In any embodiment where a pane is mentioned, the pane may comprise chemically toughened glass.

In any embodiment where a pane is mentioned, the pane may comprise heat strengthened glass.

In any embodiment where a pane is mentioned, the pane may comprise laminated glass. Laminated glass contains additional layers, for example polyvinyl butyral (for example as a foil) which can improve fire and/or shock resistance.

In any embodiment where a pane is mentioned, the pane may comprise laminated toughened glass.

In any embodiment where a pane is mentioned, the pane may comprise laminated glass comprising a layer of polyvinyl butyral foil (for example substantially as a central layer in the pane).

In any embodiment where a pane is mentioned, the pane may comprise UV transmissive laminated glass.

In any embodiment where a pane is mentioned, the pane may comprise UV protective laminated glass.

In any embodiment where a pane is mentioned, the pane may comprise a combination of UV transmissive and UV protective laminated glass.

In any embodiment where a pane is mentioned, the pane may comprise coated glass. Coated glass may be hard coated or soft coated.

In any embodiment where a pane is mentioned, the pane may comprise hard coated glass.

In any embodiment where a pane is mentioned, the pane may comprise soft coated glass.

In any embodiment where a pane is mentioned, the pane may comprise a polycarbonate polymer, glass, borosilicate glass, annealed glass, thermally toughened glass, chemically toughened glass, heat strengthened glass, laminated glass, UV transmissive glass, UV protective glass, hard coated glass, soft coated glass, transparent glass, translucent glass, opaque glass, non-coloured glass, coloured glass, mirrored glass, patterned glass, extra white glass or ultra-clear glass.

In any embodiment where a pane is mentioned, the pane may be flat.

In any embodiment where a pane is mentioned, the pane may be a sheet.

In any embodiment where a pane is mentioned, the pane may be curved.

In any embodiment where a pane is mentioned, the pane may be rectangular.

In any embodiment where a pane is mentioned, the pane may have a thickness between 2 mm and 15 mm.

In any embodiment where more than one pane is mentioned (for example in any embodiment where there is a first pane and a second pane), the panes may be the same.

In any embodiment where more than one pane is mentioned, the panes may be different.

In any embodiment where there is a first pane and a second pane, there may be at least one additional pane (for example a third pane, helping define a triple glazing unit). The additional pane(s) may be adjacent to and spaced apart (for example in a parallel fashion) from any other pane and together with a seal may define an internal space, which may be in addition to any internal space or fire-resistant interlayer already present. Such additional internal spaces may comprise a fire-resistant interlayer, or alternatively they may be left empty, evacuated, or filled with an alternative substance (e.g. an insulating gas, which may result in an insulating fire-resistant glazing unit).

In any embodiment where more than one pane is mentioned, the panes may be spaced apart by about 0.1 mm to about 100 mm.

In any embodiment where more than one pane is mentioned, the panes may be spaced apart by about 1 mm to about 50 mm.

In any embodiment where more than one pane is mentioned, the panes may be spaced apart by about 2 mm to about 50 mm.

In any embodiment where more than one pane is mentioned, the panes may be spaced apart by about 5 mm to about 50 mm.

In any embodiment where more than one pane is mentioned, the panes may be spaced apart by about 5 mm to about 75 mm.

In any embodiment where more than one pane is mentioned, the panes may be spaced apart by 0.1 mm to 100 mm.

In any embodiment where more than one pane is mentioned, the panes may be spaced apart by 1 mm to 50 mm.

In any embodiment where more than one pane is mentioned, the panes may be spaced apart by 2 mm to 50 mm.

In any embodiment where more than one pane is mentioned, the panes may be spaced apart by 5 mm to 50 mm.

Fire Resistant Interlayer

A "fire resistant interlayer" may comprise any suitable material which confers fire resistant, heat absorbent, or insulating properties. It may be a solid or liquid (for example a disperse system, such as a gel) or may possess a solid-liquid transition which is not clearly defined. A fire-resistant interlayer may be homogenous, or may comprise multiple sublayers, or may comprise fire resistant regions (which may be the same or different, and regular or irregular in dimension) as well as other regions that may not themselves be fire resistant.

A fire resistant interlayer may comprise an intumescent fire protection layer, for example a layer based on an alkali metal silicate (e.g. as described in WO1994/004355, the contents of which are incorporated herein by reference), or a layer produced by drying of an alkali metal silicate composition. A fire-resistant layer can also comprise a silicone (i.e. a polysiloxane), an epoxy resin, a polyvinyl butyral (PVB) polymer, an ethylene vinyl acetate (EVA) polymer, a thermoplastic elastomer (for example one based on a polyurethane polymer [TPU]), a fluorinated hydrocarbon polymer (e.g. THV) or any other suitable material known in the art. A fire-resistant interlayer or region may also comprise combinations of fire resistant elements (e.g. a hydrogel and an alkali metal silicate).

In any embodiment where a fire-resistant interlayer is mentioned, the fire-resistant interlayer may be intumescent and/or may produce gas when heated.

In any embodiment where a fire-resistant interlayer is mentioned, the fire-resistant interlayer may comprise a hydrogel. A hydrogel is a gel where the liquid component is water. Such gels produce water when heated, conferring heat fire resistant properties to an interlayer but leading to a build-up of pressure when the interlayer is enclosed.

In any embodiment where a fire-resistant interlayer is mentioned, the fire-resistant interlayer may comprise an organic hydrogel.

Examples of organic hydrogels are known in the art and are described for example in U.S. Pat. No. 4,264,681 B [SAINT GOBAIN], WO2003/061963 [FLAMRO], WO 2009/071409 [FLAMRO], WO 2013/124661 [PYROGUARD], and WO 2015/025019 [PYROGUARD]. The content of these publications is incorporated herein by reference.

In any embodiment where a fire-resistant interlayer is mentioned, the fire-resistant interlayer may comprise any organic hydrogel described in U.S. Pat. No. 4,264,681 B [SAINT GOBAIN], WO 2003/061963 [FLAMRO], WO 2009/071409 [FLAMRO], WO 2013/124661 [PYROGUARD], or WO 2015/025019 [PYROGUARD].

In any embodiment where a fire-resistant interlayer is mentioned, the fire-resistant interlayer may comprise any organic hydrogel described in U.S. Pat. No. 4,264,681 B [SAINT GOBAIN], WO 2003/061963 [FLAMRO], WO 2009/071409 [FLAMRO].

In any embodiment where a fire-resistant interlayer is mentioned, the fire-resistant interlayer may comprise any organic hydrogel described in WO 2013/124661 [PYROGUARD] and WO 2015/025019 [PYROGUARD].

In any embodiment where a fire-resistant interlayer is mentioned, the fire-resistant interlayer may comprise any organic hydrogel described in WO 2013/124661 [PYROGUARD].

In any embodiment where a fire-resistant interlayer is mentioned, the fire-resistant interlayer may comprise any organic hydrogel described in WO 2015/025019 [PYROGUARD].

In any embodiment where a fire-resistant interlayer is mentioned, the fire-resistant interlayer may comprise an alkali metal silicate gel.

Examples of alkali metal silicate gels are known in the art and are described for example in WO 1995/051739 [INM], U.S. Pat. No. 5,565,273 A [VETROTECH] and WO 2008/084083 [PILKINGTON]. The content of these publications is incorporated herein by reference.

In any embodiment where a fire-resistant interlayer is mentioned, the fire-resistant interlayer may comprise a sodium silicate gel.

In any embodiment where a fire-resistant interlayer is mentioned, the fire-resistant interlayer may comprise any sodium silicate gel described in WO 2008/084083 [PILKINGTON].

In any embodiment where a fire-resistant interlayer is mentioned, the fire-resistant interlayer may comprise a potassium silicate gel.

In any embodiment where a fire-resistant interlayer is mentioned, the fire-resistant interlayer may comprise any potassium silicate gel described in U.S. Pat. Nos. 9,546,514 A, 8,932,508 A, WO 1995/051739 [INM], or U.S. Pat. No. 5,565,273 A [VETROTECH].

In any embodiment where a fire-resistant interlayer is mentioned, the fire-resistant interlayer may comprise a mixed metal silicate gel (for example comprising a sodium silicate gel and a potassium silicate gel).

In any embodiment where a fire-resistant interlayer is mentioned, the fire-resistant interlayer may comprise an epoxy resin polymer, a polyvinyl butyral polymer, a silicone polymer or an ethylene vinyl acetate polymer.

In any embodiment where a fire-resistant interlayer is mentioned, the fire-resistant interlayer may comprise an organic hydrogel, a potassium silicate gel, a sodium silicate gel, an epoxy resin polymer, a polyvinyl butyral polymer, a silicone polymer or an ethylene vinyl acetate polymer.

Specific Embodiments

In one embodiment there is provided a glazing unit comprising: a first pane and a second pane, which may be the same or different; a fire resistant interlayer between the panes; a spacer; a first seal which together with the panes encloses the fire-resistant interlayer; and a second seal enclosing the first seal, wherein both seals are configured to breach in the event of increased pressure between the first and second panes.

In one embodiment there is provided a glazing unit comprising: a first pane and a second pane which both comprise toughened glass or toughened laminated glass; a fire resistant interlayer comprising an organic hydrogel or a potassium silicate gel between the panes; a first seal which together with the panes encloses the fire-resistant interlayer, where the first seal consists essentially of a thermoplastic spacer; and a second seal comprising a polysulphide polymer enclosing the first seal, wherein both seals are configured to breach in the event of increased pressure between the first and second panes.

In one embodiment there is provided a glazing unit comprising: a first pane and a second pane which both comprise toughened glass or toughened laminated glass; a fire resistant interlayer comprising an organic hydrogel or a potassium silicate gel between the panes; a first seal which together with the panes encloses the fire-resistant interlayer, where the first seal consists essentially of acrylonitrile butadiene styrene which is sealingly connected to the first pane and the second pane using butyl polymer; and a second seal comprising a polysulphide polymer enclosing the first seal, wherein both seals are configured to breach in the event of increased pressure between the first and second panes.

In one embodiment there is provided a glazing unit comprising: a first pane and a second pane which both comprise toughened glass or toughened laminated glass; a fire resistant interlayer comprising an organic hydrogel or a potassium silicate gel between the panes; a first seal which together with the panes encloses the fire-resistant interlayer, where the first seal consists essentially of a thermoplastic spacer; and a second seal comprising a polysulphide polymer characterised by: a Shore A hardness of about 10 to about 45; a maximum tensile elongation of about 5%-about 70%; a loss of thermal stability at about 150° C.-about 250° C.; a tensile strength of about <0.6 MPa; and/or a weight loss of about 5%-about 50% as measured at 250° C., enclosing the first seal.

In one embodiment there is provided a glazing unit comprising: a first pane and a second pane which both comprise toughened glass or toughened laminated glass; a fire resistant interlayer comprising an organic hydrogel or a potassium silicate gel between the panes; a first seal which together with the panes encloses the fire-resistant interlayer, where the first seal consists essentially of acrylonitrile butadiene styrene which is sealingly connected to the first pane and the second pane using butyl polymer; and a second seal comprising a polysulphide polymer characterised by: a Shore A hardness of about 10 to about 45; a maximum tensile elongation of about 5%-about 70%; a loss of thermal stability at about 150° C.-about 250° C.; a tensile strength of about <0.6 MPa; and/or a weight loss of about 5%-about 50% as measured at 250° C., enclosing the first seal.

In one embodiment there is provided a glazing unit comprising: a first pane and a second pane which both comprise toughened glass or toughened laminated glass; a fire resistant interlayer comprising a potassium silicate gel between the panes; a first seal which together with the panes encloses the fire-resistant interlayer, where the first seal consists essentially of a thermoplastic spacer; and a second seal consisting essentially of a polysulphide polymer characterised by: a Shore A hardness of about 10 to about 45; a maximum tensile elongation of about 5%-about 70%; a loss of thermal stability at about 150° C.-about 250° C.; a tensile strength of about <0.6 MPa; and/or a weight loss of about 5%-about 50% as measured at 250° C., enclosing the first seal.

In one embodiment there is provided a glazing unit comprising: a first pane and a second pane which both comprise toughened glass or toughened laminated glass; a fire resistant interlayer comprising a potassium silicate gel between the panes; a first seal which together with the panes encloses the fire-resistant interlayer, wherein the first seal consists essentially of acrylonitrile butadiene styrene which is sealingly connected to the first pane and the second pane using butyl polymer; and a second seal consisting essentially of a polysulphide polymer characterised by: a Shore A hardness of about 10 to about 45; a maximum tensile elongation of about 5%-about 70%; a loss of thermal stability at about 150° C.-about 250° C.; a tensile strength of about <0.6 MPa; and/or a weight loss of about 5%-about 50% as measured at 250° C., enclosing the first seal.

Processes

Glazing units described in this specification may be prepared by methods known in the art, for example those described in U.S. Pat. No. 2,213,468 A [LIBBEY OWENS], U.S. Pat. No. 3,759,771 A [BATTERSBY], U.S. Pat. No. 2,389,360 [CORNING], or WO 2015/025159 [PYROGUARD]. The content of these publications is incorporated by reference.

In one embodiment there is provided a process for the manufacture of a glazing unit comprising a first pane and a second pane, which may be the same or different, a fire resistant interlayer between the panes, and a seal which together with the panes encloses the fire-resistant interlayer, wherein the seal is configured to breach in the event of increased pressure between the first and second panes, the process comprising: (a) providing a first and a second pane; (b) partially assembling the glazing unit by spacing apart the first and second panes and holding them in position with a seal which is configured to breach in the event of increased pressure between the first and second panes in the completed unit, the seal comprising an opening and together with the panes defining an internal space; (c) delivering a fire-resistant material into the internal space through the opening in the seal; and (d) closing the opening in the seal to enclose the fire-resistant interlayer.

In one embodiment there is provided a process for the manufacture of a glazing unit comprising a first pane and a second pane, which may be the same or different, a fire resistant interlayer between the panes, and a seal which together with the panes encloses the fire-resistant interlayer, wherein the seal is configured to breach in the event of increased pressure between the first and second panes, the process comprising: (a) providing a first and a second pane; (b) partially assembling the glazing unit by spacing apart the first and second panes and holding them in position with a seal which is configured to breach in the event of increased pressure between the first and second panes in the completed unit, the seal comprising an opening and together with the panes defining an internal space; (c) delivering a gelling composition into the internal space through the opening in the seal; (d) closing the opening in the seal to provide a sealed internal space; and (e) curing the gelling composition to provide a fire-resistant interlayer in the sealed internal space.

Uses

In one embodiment there is provided the use of a glazing unit comprising: a first pane and a second pane, which may be the same or different; a fire resistant interlayer between the panes; and a seal which together with the panes encloses the fire-resistant interlayer, wherein the seal is configured to breach in the event of increased pressure between the first and second panes, in construction.

The use of glazing units in construction is known in the art and can be effected by any suitably skilled glazier.

Constructions

Glazing units described in this specification can be used in a wide variety of constructions, for example being fixed in an external or internal door or window frame, being used as the outer wall of a building (such as a house or office block) or in vehicle construction.

In one embodiment there is provided a construction comprising a glazing unit comprising: a first pane and a second pane, which may be the same or different; a fire resistant interlayer between the panes; and a seal which together with the panes encloses the fire-resistant interlayer, wherein the seal is configured to breach in the event of increased pressure between the first and second panes.

In any embodiment where a construction is mentioned, the construction may be a window, door, partition, vehicle or building.

DRAWINGS

DESCRIPTION

Figure 1:
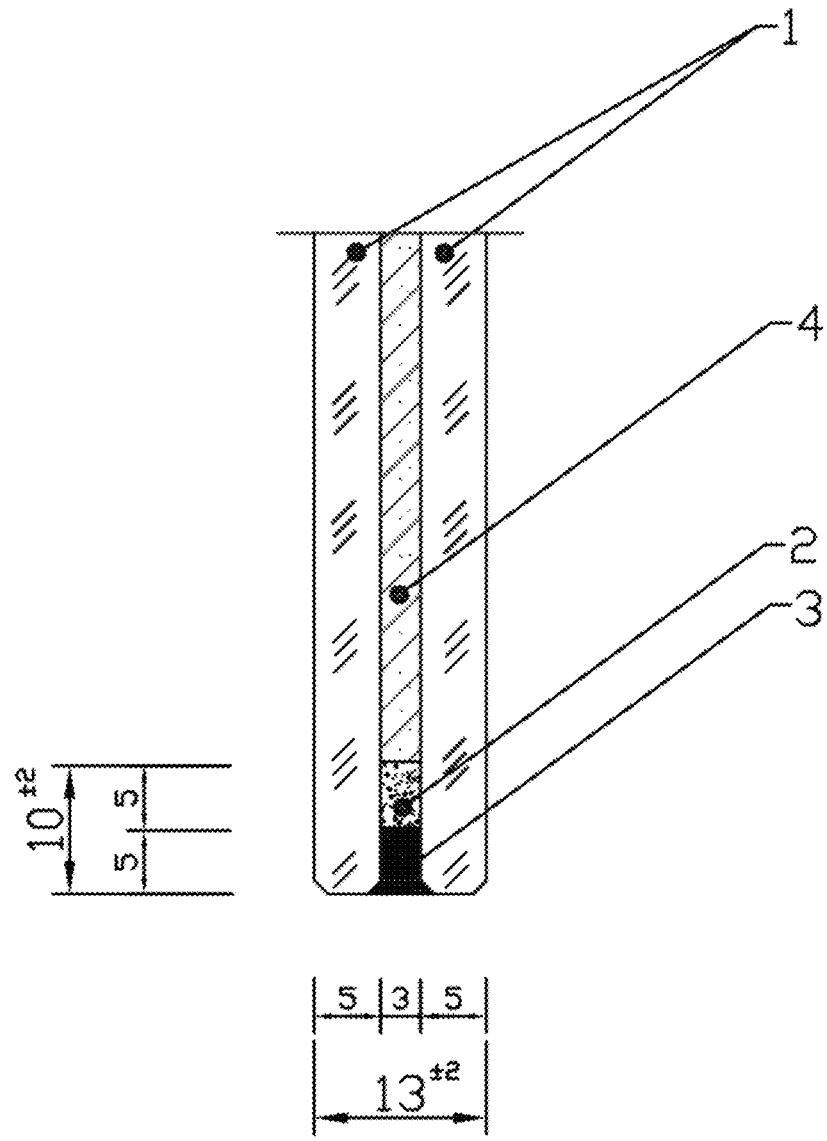
FIG. 1 is a cross section of a glazing unit of configuration A.
Figure 2:
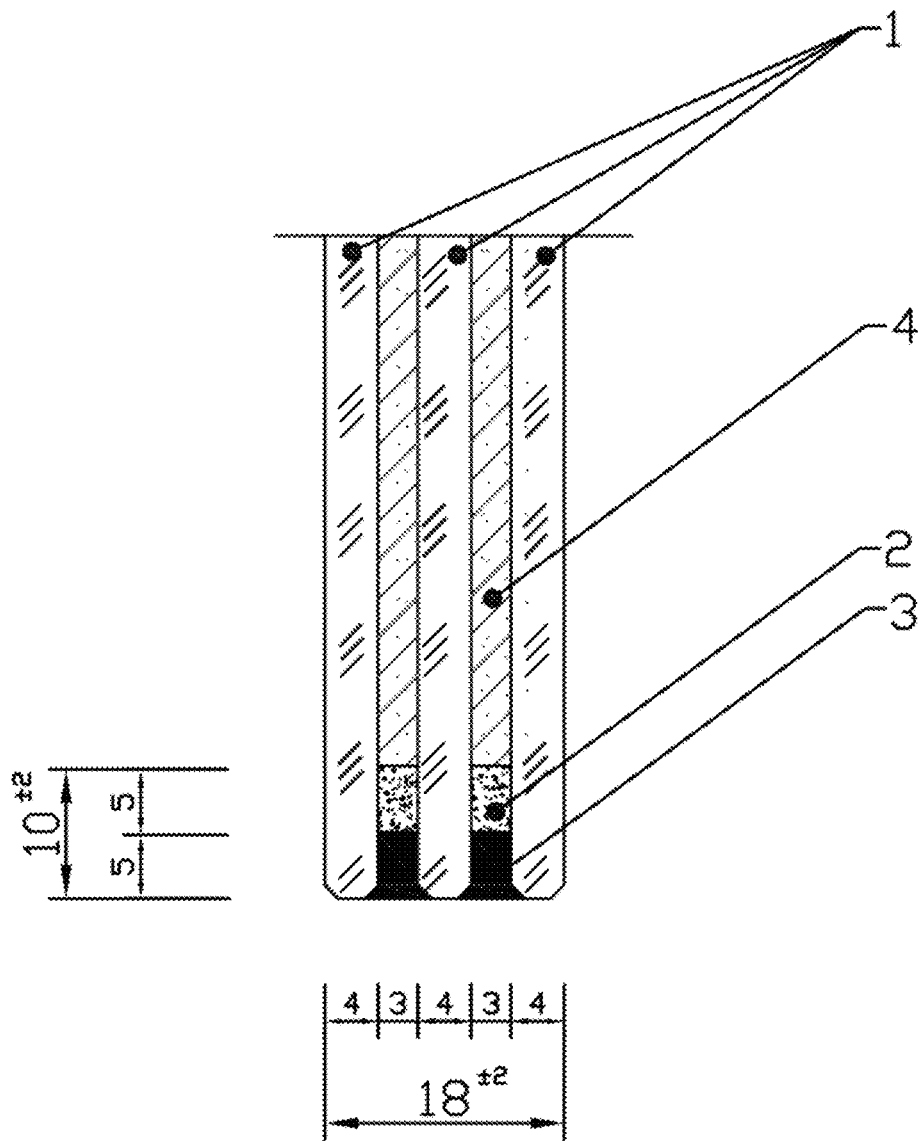
FIG. 2 is a cross section of a glazing unit of configuration B.
Figure 3:
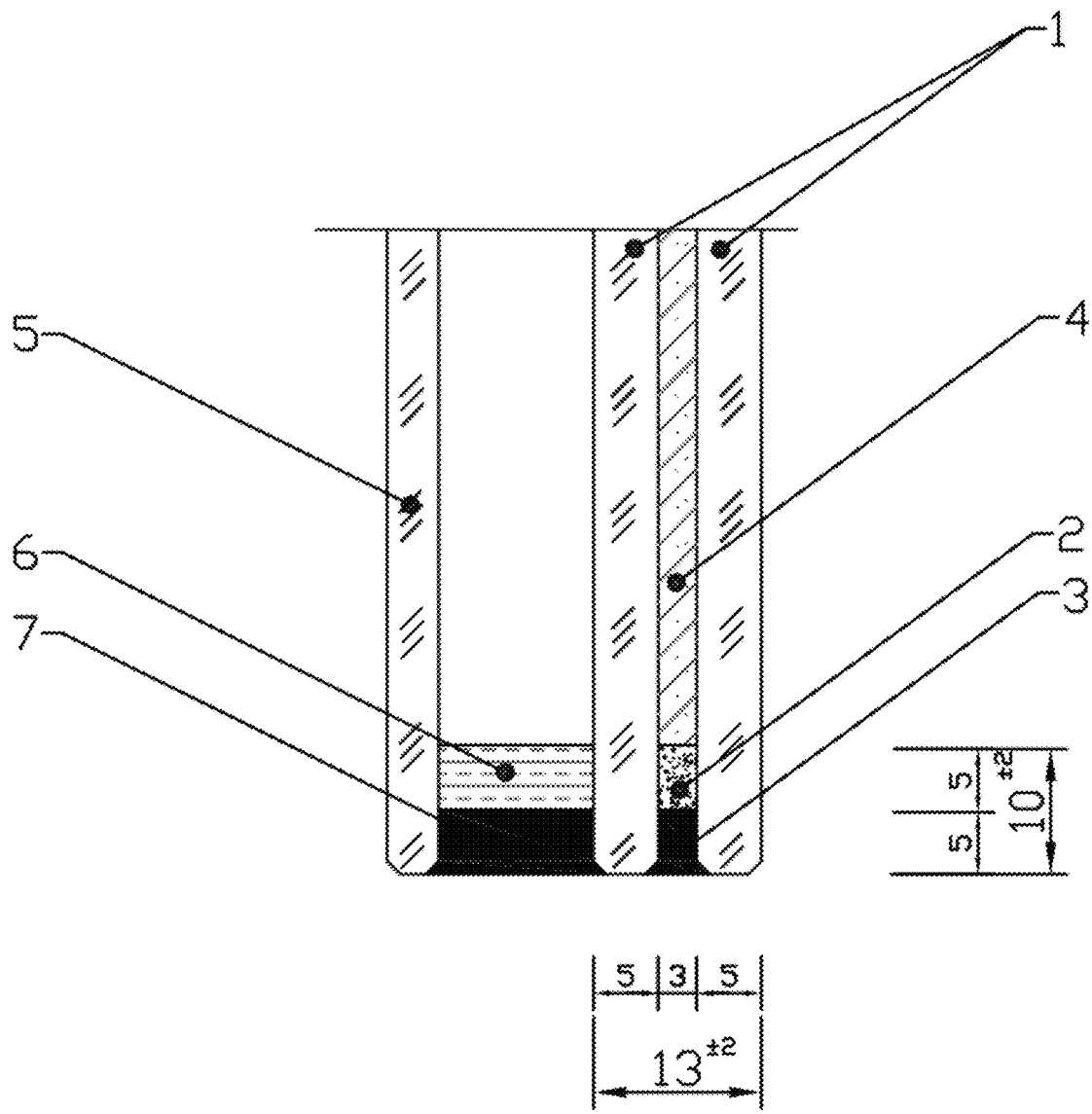
FIG. 3 is a cross section of a glazing unit of configuration C.

Example glazing units can have a number of possible basic configurations, which are illustrated in FIGS. 1 to 3.

Configuration A

Glazing unit configuration A is depicted cross-sectionally in FIG. 1. The glazing unit has two parallel opposed rectangular panes 1 separated at their peripheries by a primary seal comprising spacer 2. Spacer 2 is sealingly connected to the panes it separates with an adhesive (not labelled). The primary seal formed from spacer 2 and its adhesive encloses an internal space 4 along with the two opposed panes 1. Each pane 1 has a thickness of about 5 mm. Spacer 2 is about 5 mm high (i.e. extends inward from the perimeter of the pane by about 5 mm) and consists of a single continuous elongate piece of material bent into a substantially rectangular shape following the perimeter of pane 1. A fire-resistant interlayer fills the internal space 4 enclosed by the primary seal. Both the fire-resistant interlayer and the primary seal are enclosed by a secondary seal 3. The secondary seal 3 is substantially the same height as spacer 2.

Configuration B

Glazing unit configuration B is depicted cross-sectionally in FIG. 2. The configuration is similar to configuration A but triple glazed, with three panes of toughened glass 1 defining two internal spaces 4 both enclosing fire-resistant interlayers.

Configuration C

Glazing unit configuration C is depicted cross-sectionally in FIG. 3. This is an alternative_triple glazing unit building on the structure of Configuration A with a further pane 5, which together with spacer 6 and secondary seal 7 defines an additional internal space (not labelled) parallel to internal space/fire resistant interlayer 4. The additional internal space may be evacuated to form an insulating fire-resistant glazing unit.

The following examples are for illustration only and should not be taken to limit the scope of the invention.

TABLE 1

Examples

| Example No. | Configuration | Panes | Primary Seal | Secondary Seal | Fire Resistant Interlayer |
|---|---|---|---|---|---|
| 1 | A | Toughened glass | Acrylobutadiene polymer spacer bound to pane with butyl polymer adhesive | Polysulphide polymer characterised by a Shore A hardness of 25 | Organic hydrogel |
| 2 | A | Toughened glass | Acrylobutadiene polymer spacer bound to pane with butyl polymer adhesive | Polysulphide polymer characterised by a Shore A hardness of 25 | Potassium silicate gel |
| 3 | A | Toughened glass | Thermoplastic spacer[1] | Polysulphide polymer characterised by a Shore A hardness of 25 | Organic hydrogel |
| 4 | A | Toughened glass | Thermoplastic spacer | Polysulphide polymer characterised by a Shore A hardness of 25 | Potassium silicate gel |
| 5 | A | Toughened glass | Thermoplastic spacer | Polysulphide polymer characterised by a Shore A hardness of 40, a Young's Modulus of 0.4 MPa, and a tensile elongation of 58.3% | Potassium silicate gel |
| 6 | B | Toughened glass | Acrylonitrile butadiene styrene polymer spacer bound to pane with butyl polymer adhesive | Polysulphide polymer characterised by a Shore A hardness of 25 | Organic hydrogel |
| 7 | B | Toughened glass | Acrylonitrile butadiene styrene polymer spacer bound to pane with butyl polymer adhesive | Polysulphide polymer characterised by a Shore A hardness of 25 | Potassium silicate gel |
| 8 | B | Toughened glass | Thermoplastic spacer | Polysulphide polymer characterised by a Shore A hardness of 25 | Organic hydrogel |

TABLE 1-continued

Examples

| Example No. | Configuration | Panes | Primary Seal | Secondary Seal | Fire Resistant Interlayer |
|---|---|---|---|---|---|
| 9 | B | Toughened glass | Thermoplastic spacer | Polysulphide polymer characterised by a Shore A hardness of 25 | Potassium silicate gel |
| 10 | C | Toughened glass | Acrylonitrile butadiene styrene polymer spacer bound to pane with butyl polymer adhesive | Polysulphide polymer characterised by a Shore A hardness of 25 | Organic hydrogel |
| 11 | C | Toughened glass | Acrylonitrile butadiene styrene polymer spacer bound to pane with butyl polymer adhesive | Polysulphide polymer characterised by a Shore A hardness of 25 | Potassium silicate gel |
| 12 | C | Toughened glass | Thermoplastic spacer | Polysulphide polymer characterised by a Shore A hardness of 25 | Organic hydrogel |
| 13 | C | Toughened glass | Thermoplastic spacer | Polysulphide polymer characterised by a Shore A hardness of 25 | Potassium silicate gel |
| 14 | A | One pane of toughened glass and one pane of laminated glass comprising a layer of polyvinyl butyral foil[2] | Acrylonitrile butadiene styrene polymer spacer bound to pane with butyl polymer adhesive | Polysulphide polymer characterised by a Shore A hardness of 25 | Organic hydrogel |
| 15 | A | One pane of toughened glass and one pane of laminated glass comprising a layer of polyvinyl butyral foil[2] | Acrylonitrile butadiene styrene polymer spacer bound to pane with butyl polymer adhesive | Polysulphide polymer characterised by a Shore A hardness of 25 | Potassium silicate gel |
| 16 | A | One pane of toughened glass and one pane of laminated glass comprising a layer of polyvinyl butyral foil | Thermoplastic spacer | Polysulphide polymer characterised by a Shore A hardness of 25 | Organic hydrogel |
| 17 | A | One pane of toughened glass and one pane of laminated glass comprising a layer of polyvinyl butyral foil | Thermoplastic spacer | Polysulphide polymer characterised by a Shore A hardness of 25 | Potassium silicate gel |

TABLE 1-continued

| | | | Examples | | |
|---|---|---|---|---|---|
| Example No. | Configuration | Panes | Primary Seal | Secondary Seal | Fire Resistant Interlayer |
| 18 | A | Laminated glass comprising a layer of polyvinyl butyral foil[3] | Acrylonitrile butadiene styrene polymer spacer bound to pane with butyl polymer adhesive | Polysulphide polymer characterised by a Shore A hardness of 25 | Organic hydrogel |
| 19 | A | One pane of toughened glass and one pane of laminated glass comprising a layer of polyvinyl butyral foil | Acrylonitrile butadiene styrene polymer spacer bound to pane with butyl polymer adhesive | Polysulphide polymer characterised by a Shore A hardness of 25 | Potassium silicate gel |
| 20 | A | One pane of toughened glass and one pane of laminated glass comprising a layer of polyvinyl butyral foil | Thermoplastic spacer | Polysulphide polymer characterised by a Shore A hardness of 25 | Organic hydrogel |
| 21 | A | One pane of toughened glass and one pane of toughened glass comprising a layer of polyvinyl butyral foil approximately at its centre | Thermoplastic spacer | Polysulphide polymer characterised by a Shore A hardness of 25 | Organic hydrogel |
| 22 | A | Toughened glass | Thermoplastic spacer | Polysulphide polymer characterised by a Shore A hardness of 45 comprising a section of nylon polymer | Potassium silicate gel |
| 23 | A | Toughened glass | Thermoplastic spacer | Polysulphide polymer characterised by a Shore A hardness of 45 comprising a section of nylon polymer | Potassium silicate gel |
| 24 | A | Toughened glass | Thermoplastic spacer | Polysulphide polymer characterised by a Shore A hardness of 45 scored to remove a v-shaped notch of material | Potassium silicate gel |

TABLE 1-continued

Examples

| Example No. | Configuration | Panes | Primary Seal | Secondary Seal | Fire Resistant Interlayer |
|---|---|---|---|---|---|
| 25 | A | Toughened glass | Thermoplastic spacer | Polysulphide polymer characterised by a Shore A hardness of 45 comprising four corner shims embedded at the corners of the seal | Potassium silicate gel |
| Reference Example 1 (Does not embody the invention) | A | Toughened glass | Thermoplastic spacer | Silicone polymer (DOW CORNING® 3362 insulating glass sealant) of Shore A hardness 41 | Potassium silicate gel |
| Reference Example 2 (Does not embody the invention) | A | Toughened glass | Thermoplastic spacer | Polysulphide polymer characterised by a Shore A hardness of 45 | Potassium silicate gel |

Figure 4:
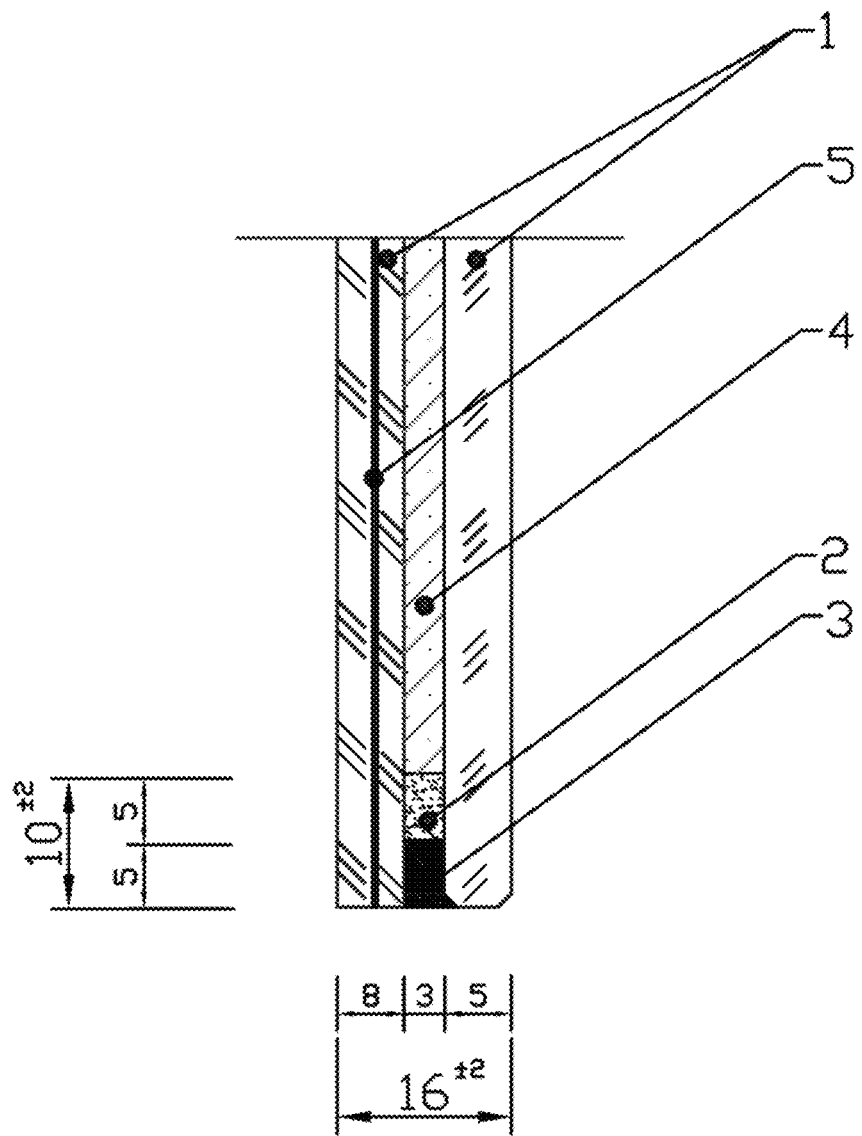
FIG. 4 is a cross section of the Configuration of Examples 13-16.
Figure 5:
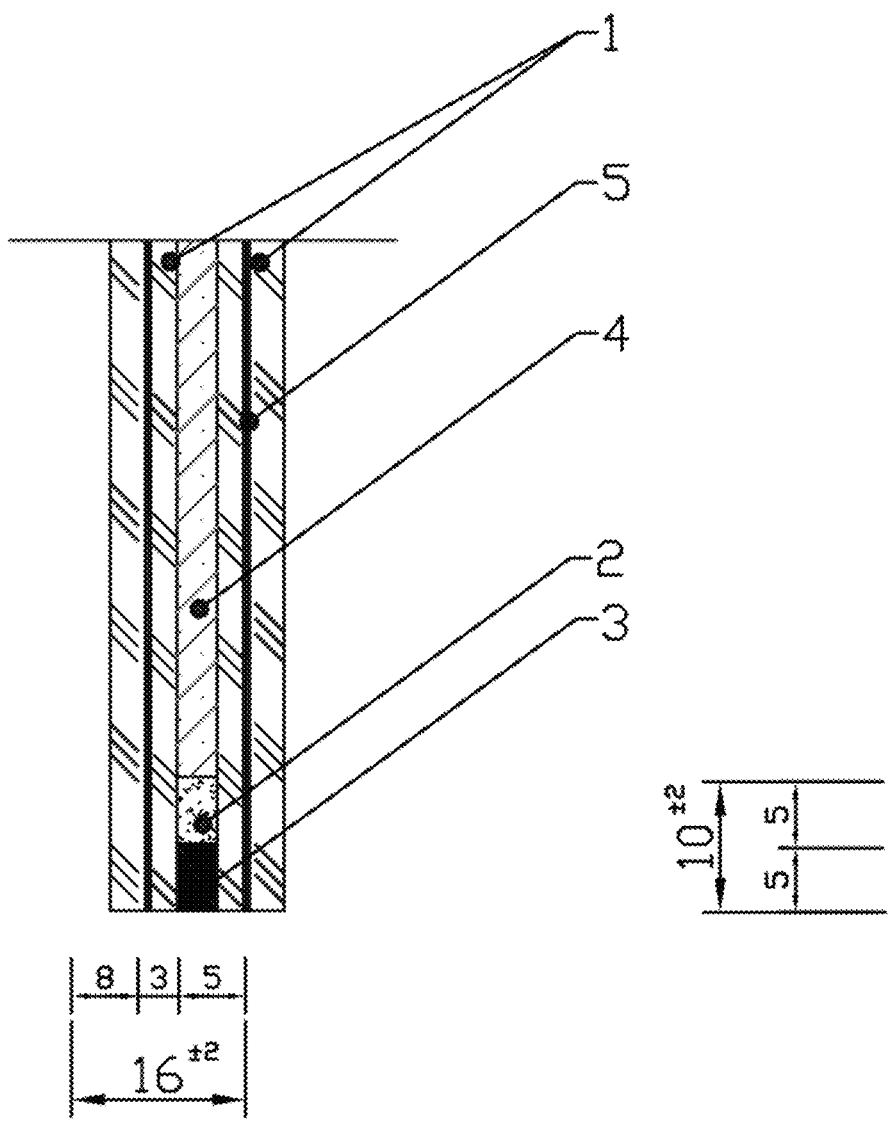
FIG. 5 is a cross section of the Configuration of Example 17.

[1]Binds to panes to form a primary seal without the need for a separate adhesive.
[2]See FIG. 4See FIG. 5

General Experimental Details

Polysulphide polymers with the properties described in this specification can be obtained commercially (for example IGK 311 or IGK 330 from Isolierglasklebstoffe GmbH, Frankfurt, Germany) or prepared according to methods described in Lee, T. "*Properties and Applications of Elastomeric Polysulfides*"; RAPRA Review Reports; Smithers RAPRA (Shrewsbury, United Kingdom); 1 Jan. 1999 (http://www.smithersrapra.com/publications/books/browse-by-category/review reports/properties-applications-elastomeric-polysulfides). For example, it is possible to prepare the polysulphide polymers described herein which have a Shore A hardness of <45 by obtaining IGK 330 and increasing the amount of the plasticiser component beyond that recommended by the supplier when preparing the polymer.

Silicone polymers with the properties described in this specification can be obtained commercially or prepared by methods described in "The use of Silicone Sealants in Dual-Sealed Insulating Glass Units", Insulating Glass Technical Manual, Dow Corning America. 2013 (https://www.dowcorning.com/content/publishedlit/62-1492-01.pdf).

Polyurethane polymers with the properties described in this specification can be obtained commercially (e.g. IGK 130 from Isolierglasklebstoffe GmbH, Frankfurt, Germany) and modified according to methods known in the art.

Butyl polymers with the properties described in this specification can be obtained commercially (e.g. Euroseal from Thermoseal, Wigan, United Kingdom).

Other materials referred to in the specification are readily available commercially or can be prepared by the skilled person with a common general knowledge of fire resistant glazing units.

A Zwick Roell 3115 Durometer was used for measuring Shore A Hardness values at 22° C. Each test material was placed on a flat surface and the durometer was brought into contact with its surface. The durometer was then pressed against the material's surface. After indentation had occurred, the final reading was taken. The test was repeated 3 times and an average value was adopted.

A Zwick Roell Z030 tensile tester was used for measuring the maximum tensile elongation. Measurements were carried out at 22° C. Each material was prepared from a mold 2 mm×60 mm×10 mm and presented to the equipment such that a gauge length of approximately 20 mm was obtained. The material was then clamped on to the tester before zeroing the normal force. The material was then subjected to tension using a separation speed of 50 mm/min. The increase in the material's pre-registered gauge length was measured and expressed as a percentage of its original gauge length.

A TA Instruments AR G2 rheometer was used for determining loss of thermal stability in the test materials, using an oscillation procedure. The rheometer was fitted with an environmental testing chamber (ETC). An ETC bottom fixture and a 25 mm ETC parallel steel plate were used. The sample was prepared having a diameter of 25 mm. After placing the sample between the rheometer plates, the gap was closed until a 1N normal force was achieved. Controlled heating was then commenced between 25° C. and 225° C. using a 20° C./min gradient. A frequency value of 1 Hz and strain value of 3e-3% were used during the measurement. Changes in the storage and loss moduli were then monitored and plotted against temperature.

A thermogravimetric analysis approach was used when determining the loss of thermal stability in the materials. Weight loss in the test materials was monitored as a function of heating temperature. A TA Instruments TGA 5500 tester was used for the measurements. Approximately 5 mg of each test material was used. Weight loss was monitored in an air atmosphere using a heating rate of 20° C./min, for heating between 25° C. and 800° C.

A Zwick Roell Z030 tester was used for recording tensile strength. Measurements were obtained at 22° C. Samples of the material were prepared into 'dog-bone'-shape having a neck of dimensions 2 mm×2 mm, using a press. Thus, samples were obtained having desirable shoulders for gripping. The sample was then mounted on to the tensile tester such that the gauge length was 20 mm and was subjected to controlled tension, using a gap speed of 50 mm/min. The tensile force was recorded as a function of gauge length (deformation). Stress/strain curves were then plotted after normalising the data with respect to the material's dimensions.

Testing Protocols

Fire Test—Reference Example 1

A 570 mm×2200 mm glazing unit in 5/3/5 [glass (mm)/ interlayer (mm)/glass (mm)] arrangement was prepared having a potassium silicate gel interlayer and using silicone polymer (DOW CORNING® 3362 insulating glass sealant) of Shore A hardness 41 and a tensile strength of 1.03 MPa as the secondary seal. The sample was fire tested in a steel frame according to EN 1364-1. The unit was observed to balloon and fire side pane broke in an unfavourable manner.

Fire Test—Reference Example 2

A 570 mm×2200 mm glazing unit in 5/3/5 [glass (mm)/ interlayer (mm)/glass (mm)] arrangement was prepared having a potassium silicate gel interlayer and using a polysulphide polymer of Shore A hardness 45, a tensile strength of 1.2 MPa, and a weight loss of 3.2% at 250° C. as the secondary seal. The sample was fire tested in a steel frame according to EN 1364-1. The unit was observed to balloon and the fire side pane broke in an unfavourable manner.

Fire Test—Example 4

A 570 mm×2200 mm glazing unit in 5/3/5 [glass (mm)/ interlayer (mm)/glass (mm)] arrangement was prepared having a potassium silicate gel interlayer and a polysulphide polymer of Shore A hardness 25, and a weight loss of 9.3% at 250° C., as the secondary seal. The sample was fire tested in a steel frame according to EN1364-1. The unit was observed to balloon and subsequently steam release was observed. The fire side pane then broke in a favourable manner because of thermal shock.

Partial Fire Test—Example 4

Figure 6:
FIG. 6 shows the result of testing a glazing unit with a polysulphide polymer seal characterised by a Shore A hardness of 25 (Example 2) according to EN 1364-1.

A 570 mm×2200 mm glazing unit in 5/3/5 [glass (mm)/ interlayer (mm)/glass (mm)] arrangement having a potassium gel silicate interlayer was prepared using a polysulphide polymer of Shore A hardness 25 and a weight loss of 9.3% at 250° C., as the secondary seal. The sample was fire tested in a steel frame according to EN1364-1. The unit was observed to balloon and subsequently steam release was observed. The test was stopped prior to breakage of the fire side pane in order to assess the structure of the unit. Subsequent examination revealed several bursts in the seal where steam had vented. FIG. 6 shows a picture taken of the unit following the test. A seal burst can be seen at point "A", while the surrounding pane "B" can be seen to be intact. The thermoplastic spacer "C" (i.e. the primary seal) and secondary seal residue at "A" can be seen to have been pushed outwards by pressure build-up between the first and second panes, this pressure eventually causing the seal to breach.

Fire Test—Example 5

A 570 mm×2200 mm glazing unit in 5/3/5 [glass (mm)/ interlayer (mm)/glass (mm)] arrangement was prepared having a potassium silicate gel interlayer and a polysulphide polymer of Shore A hardness 40, a Young's Modulus of 0.4 MPa, and a tensile elongation of 58.3% as the secondary seal. The sample was fire tested in a steel frame according to EN 1364-1. The unit was observed to balloon and subsequently steam release was observed. The fire side pane then broke in a favourable manner because of thermal shock.

Fire Test—Example 22

A 570 mm×2200 mm glazing unit in 5/3/5 [glass (mm)/ interlayer (mm)/glass (mm)] arrangement was prepared having a potassium silicate gel interlayer and a polysulphide polymer of Shore A hardness 45 as the secondary seal. A part of the secondary seal was removed and in its place was embedded a nylon plastic piece of 3 mm×5 mm×20 mm. The sample was fire tested in a steel frame according to EN 1364-1. The unit was observed to balloon and subsequently steam release was observed from the position of the nylon plastic piece. The fire side pane then broke in a favourable manner because of thermal shock.

Fire Test—Example 23

A 570 mm×2200 mm glazing unit in 5/3/5 [glass (mm)/ interlayer (mm)/glass (mm)] arrangement was prepared having a potassium silicate gel interlayer and a polysulphide polymer of Shore A hardness 50 as the secondary seal. A part of the secondary seal was removed and in its place was embedded a piece of butyl polymer of 3 mm×5 mm×20 mm (butyl melting point 170° C.). The sample was fire tested in a steel frame according to EN 1364-1. The unit was observed to balloon and subsequently steam release was observed from the position of the butyl polymer insert. The fire side pane then broke favourably in a non-explosive manner because of thermal shock.

Fire Test—Example 24

A 570 mm×2200 mm glazing unit in 5/3/5 (glass (mm)/ interlayer (mm)/glass (mm)) composition having a potassium silicate gel interlayer was prepared using a polysulphide polymer of Shore A hardness 45 as the secondary seal. In this example, the secondary seal was scored to remove a "v"-shaped notch of sealant extending from the outer edge of the seal towards the centre of the glazing unit by about 30% of the seal width. The sample was fire tested in a steel frame according to EN 1364-1. Steam release was observed and ballooning was minimal. The fire side pane then broke favourably in a non-explosive manner because of thermal shock.

Fire Test—Example 25

A 570 mm×2200 mm glazing unit in 5/3/5 [glass (mm)/ interlayer (mm)/glass (mm)] arrangement was prepared having a potassium silicate gel interlayer and a polysulphide polymer of Shore A hardness 45 as the secondary seal. Four corner shims were embedded into the secondary seal at the corners of the unit. The sample was fire tested in a steel frame according to EN 1364-1. The unit was observed to balloon and subsequently steam release was observed. The fire side pane then broke favourably in a non-explosive manner because of thermal shock.

What is claimed is:

1. A glazing unit, comprising:
a first pane and a second pane, which may be the same or different;
a fire resistant interlayer between the first pane and the second pane; and
a non-porous seal which, together with the first pane and the second pane, encloses the fire-resistant interlayer,
wherein the non-porous seal is configured to breach in an event of increased pressure between the first pane and the second pane; and
a second seal enclosing the non-porous seal, the second seal comprising a polysulphide polymer characterised by: a Shore A hardness of about 10 to less than 45, a maximum tensile elongation of about 5%-about 70%, a loss of thermal stability at about 150° C.-about 250° C., a tensile strength of about 0.6 MPa, and a weight loss of about 5%-about 50% as measured at 250° C.,
wherein:
the first pane and the second pane both comprise toughened glass or toughened laminated glass,
the fire resistant interlayer comprises an organic hydrogel or a potassium silicate gel between the first pane and the second pane, and
the non-porous seal consists essentially of a thermoplastic spacer.

2. A glazing unit, comprising:
a first pane and a second pane, which may be the same or different;
a fire resistant interlayer between the first pane and the second pane; and
a first seal which, together with the first pane and the second pane, encloses the fire-resistant interlayer,
wherein the first seal is configured to breach in an event of increased pressure between the first pane and the second pane; and
a second seal enclosing the first seal, the second seal comprising a polysulphide polymer characterised by a Shore A hardness of about 10 to less than 45, a maximum tensile elongation of about 5%-about 70%, a loss of thermal stability at about 150° C.-about 250° C., a tensile strength of about 0.6 MPa, and a weight loss of about 5%-about 50% as measured at 250° C.,
wherein:
the first pane and the second pane both comprise toughened glass or toughened laminated glass,
the fire resistant interlayer comprises an organic hydrogel or a potassium silicate gel between the first pane and the second pane, and
the first seal consists essentially of acrylonitrile butadiene styrene which is sealingly connected to the first pane and the second pane using butyl polymer.

* * * * *